United States Patent [19]
Wachter et al.

[11] Patent Number: 5,745,437
[45] Date of Patent: Apr. 28, 1998

[54] METHOD AND APPARATUS FOR COHERENT BURST RANGING

[76] Inventors: Eric A. Wachter, 138 Bay Path Dr., Oak Ridge, Tenn. 37830; Walter G. Fisher, 8514 Carl Valentine, Knoxville, Tenn. 37931

[21] Appl. No.: 692,183

[22] Filed: Aug. 5, 1996

[51] Int. Cl.$^6$ ................................................ G01S 15/00
[52] U.S. Cl. ........................................ 367/100; 342/127
[58] Field of Search ............................. 367/100; 342/105, 342/107, 109, 118, 127, 129, 18, 131, 194, 137

[56] References Cited

U.S. PATENT DOCUMENTS

| | | | |
|---|---|---|---|
| 3,298,024 | 1/1967 | Böhm | 342/127 |
| 3,614,226 | 10/1971 | Vergoz | 342/118 |
| 3,652,161 | 3/1972 | Ross | 342/118 |
| 3,735,403 | 5/1973 | Sykes | 342/194 |
| 5,455,588 | 10/1995 | Lew et al. | 342/109 |
| 5,497,160 | 3/1996 | Koehler et al. | 342/127 |

OTHER PUBLICATIONS

R.T.H. Collis and P.B. Russell, Topics-in Applied Physics, vol. 14, Laser Monitoring of the Atmosphere, E.D. Hinkley (ed), Springer-Verlag, New York, 1976, pp. 79–80.

N. Takeuchi, N. Sugimoto, H. Baba and K. Sakurai, "Random Modulation CW Lidar," *Applied Optics*, 22 (1983) 1382–1386.

N. Takeuchi, H. Baba, K. Sakurai and T. Ueno, "Diode-Laser Random-Modulation CW LIDAR," *Applied Optics*, 25 (1986) 63–67.

L. Mullen and P.R. Herczfeld, "Ocean Mass Simulator for Underwater LIDAR Applications," *IEEE Oceans*, vol. II (1993) 365–368.

(List continued on next page.)

*Primary Examiner*—Daniel T. Pihulic

[57] ABSTRACT

A high resolution ranging method is described utilizing a novel modulated waveform, hereafter referred to as coherent burst modulation. In the coherent burst method, high frequency modulation of an acoustic or electromagnetic transmitter, such as a laser, is performed at a modulation frequency. This modulation frequency is transmitted quasi-continuously in the form of interrupted bursts of radiation. Energy from the transmitter is directed onto a target, interacts with the target, and the returning energy is collected. The encoded burst pattern contained in the collected return signal is detected coherently by a receiver that is tuned so as to be principally sensitive to the modulation frequency. The receiver signal is processed to determine target range using both time-of-flight of the burst envelope and phase shift of the high frequency modulation. This approach effectively decouples the maximum unambiguous range and range resolution relationship of earlier methods, thereby allowing high precision ranging to be conducted at arbitrarily long distances using at least one burst of encoded energy. The use of a receiver tuned to the high frequency modulation contained within the coherent burst vastly improves both sensitivity in the detection of the target return signal and rejection of background interferences, such as ambient acoustic or electromagnetic noise. Simultaneous transmission at several energies (or wavelengths) is possible by encoding each energy with a separate modulation frequency or pattern; electronic demodulation at the receiver allows the return pattern for each energy to be monitored independently. Radial velocity of a target can also be determined by monitoring change in phase shift of the return signal as a function of time.

23 Claims, 12 Drawing Sheets

OTHER PUBLICATIONS

L. Mullen, A. Vieira, P.R. Herczfeld and V.M. Contarino, "Experimental and Theoretical Analysis of a Microwave-Modulated LIDAR System," *Proceedings of the 24th European Microwave Conference*, Sep. 1994, p. 1691.

L. Mullen, P. R. Herczfeld and V.M. Contarino, "Modulated Pulse LIDAR System for Shallow Underwater Target Detection," *OCEANS '94 Student Poster Program, IEEE Oceanic Engineering Society Newsletter*, Winter 1994, pp. 15–19.

P.S. Millar, K.D. Christian and C.T. Field, "Demonstration of High Sensitivity Laser Ranging System," *Proceedings of the Semiconductor Lasers Advanced Devices and Applications Conference*, paper TuB4–1, OSA Technical Digest Series vol. 20, Aug. 21–23, 1995.

J.B. Abshire, P.S. Millar, X. Sun, "Semiconductor Laser-Based Ranging Instrument for Earth Gravity Measurements," *Proceedings of the Semiconductor Lasers Advanced Devices and Applications Conference*, paper TuB5–2, OSA Technical Digest Series vol. 20, Aug. 21–23, 1995.

R.I. MacDonald, "Frequency Domain Optical Reflectometer," *Applied Optics*, 20 (1981) 1840–1844.

R.I. MacDonald and Brent E. Swekla, "Frequency Domain Optical Reflectometer Using a GaAs Optoelectronic Mixer," *Applied Optics*, 29 (1990), 4578–4582.

S. Venkatesh and D.W. Dolfi, "Incoherent Frequency Modulated CW Optical Reflectometry with Centimeter Resolution," *Applied Optics*, 29 (1990) 1323–1326.

METHOD AND APPARATUS FOR COHERENT BURST RANGING

This invention was made with Government support under Contract No. DE-AC05-84OR21400 awarded by the U.S. Department of Energy to Lockheed Martin Energy Systems, Inc. The U.S. Government has rights in this invention pursuant to Contract No. DE-AC05-84OR21400 awarded by the U.S. Department of Energy; Lockheed Martin Energy Systems and the Oak Ridge Associated Universities have waived all rights to this invention to the inventors.

BACKGROUND OF THE INVENTION

1. Field of the Invention

The present invention relates generally to methods and apparatus for measuring distance to a target, velocity of the target, and composition of the target, which can be a solid, liquid or vapor. Transceiver energies used with the method may be in the acoustic, optical, x-ray, radio-frequency, microwave, millimeter-wave or other electromagnetic energy bands.

2. Description of the Prior Art

An urgent need exists in many industries, disciplines and governmental interests for a method capable of rapidly and precisely measuring any combination of distance, velocity, or composition of a remote target. To be practical, such a method must be usable with most or all types of acoustic or electromagnetic transmitters, such as laser or microwave transmitters; it must utilize relatively simple instrumentation and components for fabrication; it must provide high resolution at both short and long range; it must provide high discrimination against background noise; and it must require relatively low transmitter powers.

For the typical example of laser ranging, the prior art is substantially represented by only two fundamental ranging principles. One is time-of-flight (TOF) ranging and the other is continuous wave (CW) ranging. The fundamental concepts represented by these methods and by apparatus based on these methods are essentially similar for numerous applications and devices used in other bands of the electromagnetic spectrum, such as the microwave band, and in acoustic bands, such as the ultrasound band. Accordingly, for the sake of clarity, we will focus the description of prior art primarily on laser ranging.

Although the approaches represented by TOF and CW ranging are well represented commercially and in the technical literature, their respective performance characteristics are less than desired. In both approaches, instantaneous ranging that is both highly precise and unambiguous at long range is essentially impossible due to fundamental limitations in the ranging techniques. Specifically, these prior methods operate as follows:

TOF Laser Ranging. A short pulse of energy emitted from a laser transmitter is used to illuminate a target. Scattered light returning from the illuminated target is measured using a high speed receiver that is co-located with the transmitter. The temporal delay between transmission and detection of a return signal is measured to determine range, based on the relationship, $R=ct/2$, where R is the distance from the transceiver to the target (often called target range), c is the speed of light, and t is the elapsed time between transmission and reception; the factor of 0.5 in the equation arises from the round-trip travel of the transmitted and received signal. Very short laser pulses ($\leq 10$ ns) are needed to achieve high measurement precision, since the distance resolution, $\Delta R$, possible in TOF is generally taken to be related to laser pulse width, $\tau$, according to the relationship, $\Delta R=c\tau/2$. For example, with a 10 ns laser pulse, TOF resolution is limited to approximately 1.5 m. Furthermore, a low transmitter duty cycle (or fraction of time when the transmitter is "on" versus "off") is usually needed to avoid overlap of return signals for sequential pulses that have interacted with distant targets, since the maximum unambiguous range, $R_{AMB}$, is related to the pulse repetition frequency, PRF, by the relationship, $R_{AMB}=c/(2\ PRF)$. Note that a 10 Hz PRF is quite common with TOF systems, affording a maximum unambiguous range of 15,000 km. Very high detector speeds (where the detector rise time $<<\tau$) are critical with TOF methods to preserve measurement precision, and huge quantities of data must be collected to effect this precision over a sizeable distance. In general, any TOF approach is most amenable to use at very long distances, where the compromises between excellent $R_{AMB}$ and poor absolute $\Delta R$ performance may not be a concern. Conversely, TOF is poorly suited for measurement of targets at close range, where the magnitude of $\Delta R$ becomes large relative to R.

In this simple example of TOF laser ranging, the optical frequency of the transmitted radiation constitutes a carrier frequency upon which an encoding pattern is imposed, specifically a binary off-on-off pattern that is emitted as a short burst of optical energy. The detector can be made primarily responsive to this carrier through the use of an optical bandpass filter in the receiving optics. In other energy bands, such as microwaves, the carrier might be a specific microwave frequency that is transmitted in the form of a burst, while detector response might be limited primarily to the transmitted microwave carrier frequency using electronic bandpass filtering. In both cases, this mode of detection is referred to as incoherent detection, because there exists no defined phase relationship between the transmitted signal and the received signal. Hence, there is no phase-sensitive means for discriminating noise at the carrier frequency, such as background light, that arrives at the detector during the measurement period.

The incoherent detection systems commonly used in TOF ranging measure raw signal amplitude as a function of time. Thus, rejection of noise and other ambient or background interferences (such as daylight) is poor, and can only be partially improved by averaging signals from numerous laser pulses or by using extremely high transmitter pulse powers. In special cases, coherent detection can be used to discriminate against incoherent noise sources, such as daylight. Here, a specific phase relationship is imposed on the transmitted signal, allowing the received signal to be processed using phase-sensitive demodulation. In laser ranging, this is commonly achieved by carefully controlling the phase of the optical carrier frequency, then mixing this frequency with the received optical signal to effect phase-sensitive demodulation. When coherence is established at the optical carrier frequency, the approach is referred to as optical coherence. Optically coherent TOF ranging has been previously achieved using extremely complex laser and detector configurations that preserve optical coherence between the transmitter and detector. These optical hardware systems are relatively inflexible and have not proven to be commercially significant. One important application is Doppler laser ranging, where changes in the received optical frequency relative to the transmitted frequency can be related to radial velocity of the target (velocity of target relative to transceiver).

CW Laser Ranging. Range information is obtained by modulating a CW optical carrier frequency with a characteristic pattern, such as a sinusoidal amplitude modulation pattern. The phase delay between the transmitted signal and the detected return signal is measured to determine range, based on the relationship $R=\delta c/2f$, where $\delta$ is the fractional phase shift between the transmitted signal and the return signal, c is the speed of light, and $f$ is the modulation frequency of the laser; as in TOF ranging, the factor of 0.5 in the equation arises from the round-trip travel of the transmitted and received signal. The wavelength of this modulation, $\lambda$, is related to $f$ by the relationship, $\lambda=c/f$. Distance resolution, $\Delta R$, is given by $\Delta\delta c/2f$, where $\Delta\delta$ is the minimum measurable fractional phase shift. As an example, for $f=1$ MHz, $\lambda=300$ m, and if $\Delta\delta=0.01$, then $\Delta R=1.5$ m. Note also that with this method $R_{AMB}=\lambda/2$ (where $\delta=1$) since phase delay is linearly proportional to distance, at long distance or at high modulation frequencies, phase shifts in excess of 360° ($2\pi$ radians) will occur that cannot be distinguished from degenerate solutions to the equation $R=(\delta+n)c/2f$, where n is an integer multiple of $R_{AMB}$. The ratio ($R_{AMB}/\Delta R$) is constant for CW ranging. Hence, while high frequency modulation is desirable for maximum $\Delta R$ precision, this limits $R_{AMB}$ for the method. To avoid range ambiguity arising from aliasing (or phase wrap-around) of the modulated signal, it has been necessary to either reduce the modulation frequency (which reduces ranging precision), or to utilize several modulation frequencies in succession, either stepwise or as a frequency chirp. The latter approach precludes real time range measurement, particularly when the transceiver and target are moving relative to one another. A major advantage of the CW ranging approach is that electronic phase coherence can be maintained between the transmitter and detector based on the encoded modulation pattern. This affords a means for achieving strong rejection of incoherent noise from ambient noise sources, such as sunlight, without requiring the complex coherence apparatus necessary for achieving coherence at the optical carrier frequency.

Coherent Detection. Various coherent detection methods may be used to enhance the performance of some aspects of both TOF and CW ranging systems. The term "coherence" refers to a measurement system that maintains a controlled phase relationship, or phase-locked loop, between the transmitted and detected signals, either at the fundamental carrier frequency of the transmitted electromagnetic radiation (for example, where optical coherence is achieved using 840 nm light, which corresponds to a carrier frequency of $3.6\times 10^{14}$ Hz) or by imposition of a coherent modulation frequency upon the carrier frequency (such as amplitude modulation of 840 nm light at 100 kHz). Either approach facilitates detection of the transmitted signal by allowing phase-sensitive processing methods to be applied on the detected return.

Optical Coherence Laser Ranging. Sophisticated coherent laser ranging methods have in general been adapted from earlier RADAR (or RAdiofrequency Detection And Ranging) technologies. For example, in a coherent RADAR system, a matched filter is used to electronically extract information (such as Doppler shift) contained in the reflected return of a coherent electromagnetic carrier signal. To perform this function in laser ranging, optical mixing techniques may be used to extract similar information from the return of an extremely stable optical transmitter signal. Generally, optical coherence requires extremely complicated hardware and has proven to be much less sensitive than its RADAR counterparts due to the complexity and inefficiency of optical mixing compared to electronic mixing. Optical coherence methods are primarily useful for obtaining velocity information based on the Doppler shift of the return signal (imparted directly onto the optical carrier frequency and the modulation frequency) by a moving target. Linear or non-linear optical mixing of the return signal with a reference optical source (or local oscillator) is used to produce a difference frequency that is proportional to radial velocity of the target. Very specialized transmitters, frequently consisting of a master oscillator and local oscillator that are held in optical phase coherence with one another, are necessary for optical coherence laser ranging. Most laser transmitters cannot approach the optical frequency stability and coherence length requirements needed for optical coherence, and hence are unsuitable for this method.

Electronic Coherence Laser Ranging. In contrast to optical coherence approaches, CW laser ranging systems that are based on radio-frequency (RF) modulation of transmitter amplitude, frequency, or phase typically use another type of coherent detection. In these systems, electronic coherence is maintained between the modulated waveform transmitted and an electronic reference oscillator. Electronic mixing of the receiver signal with this reference allows phase sensitive demodulation to be performed. Note that for electronic coherence to be achieved, the precise optical stability critical for optical coherence is not necessary. Furthermore, the efficiency of electronic mixing is much better than that achievable in optical mixing. Hence, electronic coherence is generally more flexible in terms of instrumentation possibilities, is considerably less complex, and provides higher detection sensitivities. Note also that the two approaches, optical and electronic coherence, both yield Doppler information.

Several advanced variations of coherent ranging have been used to further extend performance. These include: frequency modulation (FM), pseudo random modulation (RM) and phase modulation (PM) laser ranging, each of which has been adapted from RADAR. In FM laser ranging, an amplitude modulated optical carrier frequency is transmitted using a time-varying modulation frequency; the received return signal is then electronically mixed with this FM modulation pattern. In RM laser ranging, the transmitted signal is modulated using a pseudo random binary pulse code sequence. In PM laser ranging, the phase of an amplitude modulated CW waveform is shifted, usually by 180° increments, in a characteristic pattern. In each method, the time delay to the occurrence of maximum correlation between the transmitted and received signals is used to determine range. These approaches differ from conventional CW laser ranging in that time instead of phase delay is measured to calculate range. Even so, these techniques still have range ambiguities and reduced range resolution depending on the length of the coded waveform sequence. Furthermore, the additional hardware necessary to implement these approaches increases system cost and complexity.

Numerous innovations for ranging have been provided in the prior art that are described as follows. Even though these innovations may be suitable for the specific individual purposes to which they address, they differ from the present invention as hereinafter contrasted.

R. T. H. Collis and P. B. Russell, Topics in Applied Physics, Vol. 14, Laser Monitoring of the Atmosphere, E. D. Hinkley (ed), Springer-Verlag, New York, 1976, pp. 79–80. This work describes the fundamental basis for the vast majority of ranging methods, both optical and microwave.

N. Takeuchi, N. Sugimoto, H. Baba and K. Sakurai, "Random Modulation CW Lidar," *Applied Optics*, 22 (1983)

1382. and N. Takeuchi, H. Baba, K. Sakurai and T. Ueno, "Diode-Laser Random-Modulation CW LIDAR," *Applied Optics*, 25 (1986) 63. This work describes the use of a modulation-encoded laser ranging signal (particularly RM methods) for noise suppression using low-power laser excitation. In this work a quasi-continuous, pseudo-stochastic pattern of energy is transmitted, and the detected signal is collected using a high-speed digitizer. This data is then manipulated using cross-correlation to extract range information. The modulation envelope is continuously repeated. Hence, it is impossible to super-resolve range information at levels better than that imposed by the encoding or digitization bin width and bandwidth. In this work and in similar efforts by others, no means for digitally or electronically suppressing background noise has been shown.

L. Mullen and P. R. Herczfeld, "Ocean Mass Simulator for Underwater LIDAR Applications," *IEEE Oceans*, Vol. II (1993) 365; L. Mullen, A. Vieira, P. R. Herczfeld and V. M. Contarino, "Experimental and Theoretical Analysis of a Microwave-Modulated LIDAR System," *Proceedings of the 24th European Microwave Conference*, September 1994, p. 1691; and L. Mullen, P. R. Herczfeld and V. M. Contarino, "Modulated Pulse LIDAR System for Shallow Underwater Target Detection," *OCEANS '94 Student Poster Program, IEEE Oceanic Engineering Society Newsletter*, Winter 1994, p. 15. These works look superficially similar to the invention described here, where a pulse of laser energy is modulated at microwave frequencies (for example, a 10-ns Q-switched laser pulse is modulated at 3 GHz). However, careful examination of these works show that the method is only used for reduction of noise produced from incoherent scatter. Specifically, the method taught by Mullen et al. uses high frequency modulation to shift the return signal from a hard target (such as the sea floor) to a frequency that is vastly different from the characteristic frequency observed for scatter originating from suspended particles in a water column. This provides an effective method for suppression of this incoherent interference. Notably, however, evidence of the conceptualization or use of an encoded waveform for range resolution enhancement is not taught in Mullen's examples.

P. S. Millar, K. D. Christian and C. T. Field, "Demonstration of High Sensitivity Laser Ranging System," *Proceedings of the Semiconductor Lasers Advanced Devices and Applications Conference*, paper TuB4-1, OSA Technical Digest Series Vol. 20, Aug. 21–23, 1995. This work teaches a method for parallel operation of a PM modulated laser transceiver with a dual-frequency AM modulated laser transceiver. Specifically, the PM transceiver is used to obtain coarse range estimates at long distance. A high frequency and medium frequency AM modulation pattern on a second transceiver (2 GHz and 10 MHz, respectively) are used to measure radial velocity changes with a resolution of 100 μm/sec for velocities up to 1 m/sec. The high and medium frequency AM signals are transmitted and received simultaneously using a single laser transmitter and optical receiver. While the method teaches a means for obtaining extremely accurate radial velocity information, it requires use of two transmitters using two distinctly different encoding methods to achieve unambiguous ranging. Furthermore, these transmitters are not operable simultaneously, so the method is not shown to be capable of instantaneous accurate, high precision measurement of range.

J. B. Abshire, P. S. Millar, X. Sun, "Semiconductor Laser-Based Ranging Instrument for Earth Gravity Measurements," *Proceedings of the Semiconductor Lasers Advanced Devices and Applications Conference*, paper TuB5-2, OSA Technical Digest Series Vol. 20, Aug. 21–23, 1995. This work teaches use of three signals to range and determine relative velocity, consisting of a 2 GHz and 31.25 MHz CW AM modulation from a single laser transceiver operating at 815 nm, and a PM modulation from a second laser transceiver operating at 845 nm. The latter provides coarse ranging capability, while as in the case of Millar et al., the two AM modulated signals provide high precision radial velocity information. The PM ranging method taught in this work requires a measurement time of approximately 1 sec. This precludes accurate measurement of range except when range is constant to within 4.8 m (at 31.25 MHz, $\lambda/2$=4.8 m) during the 1 sec PM measurement period; if relative velocity is greater than 4.8 m/sec (or about 10.7 mph), this approach will be unable to accurately determine range.

R. I. MacDonald, "Frequency Domain Optical Reflectometer," *Applied Optics*, 20 (1981) 1840. This fundamental work describes the basis for a large portion of reflectometer ranging using the frequency domain (sometimes called OFDR). Like CW FM laser ranging, OFDR utilizes a correlation calculation to determine range to reflective anomalies in optical fibers. The apparatus taught uses a swept frequency AM modulation of an optical carrier. This is shown to be more sensitive than time domain reflectometry (or OTDR, a method equivalent to TOF laser ranging) for high resolution measurements, but is inferior for fault location because of a reduction in back scattered energy as a consequence of the required short resolution intervals.

R. I. MacDonald and Brent E. Swekla, "Frequency Domain Optical Reflectometer Using a GaAs Optoelectronic Mixer," *Applied Optics*, 29 (1990), 4578. In this work, coherent detection is performed by optical mixing on the detector, using a triangular FM sweep on the laser transmitter modulation frequency. A fiberoptic mixer is used to launch light from the transmitter into an optical fiber under test, and to mix light returning from the test fiber with a portion of the transmitter output to produce a beat signal on the detector. This mixing represents an electronic coherence method, since it is the modulation pattern imposed on the optical carrier frequency that results in formation of the beat signal. Nevertheless, this clever approach does not circumvent the range-resolution trade-offs associated with standard CW ranging methods, since it still requires a broadly swept frequency to achieve high precision ranging of anomalies at long distances.

S. Venkatesh and D. W. Dolfi, "Incoherent Frequency Modulated CW Optical Reflectometry with Centimeter Resolution," *Applied Optics*, 29 (1990) 1323. A frequency modulated transmitter (controlled by a master frequency synthesizer) is used in this work to launch light into a fiberoptic mixer. The mixer couples the transmitter light into an optical fiber under test. Return light from the test fiber is coupled back through this mixer and into a detection unit. This detection unit couples the return light through an optical modulator, which is driven by the master frequency synthesizer so as to produce a beat pattern at an optical detector; this beat pattern is derived from correlation between the return light and the modulator drive signal, and allows ranging to be performed by OTDR based on the electronic coherence established between the modulated light and the modulator drive signal. As in previous ranging examples, this approach fails to circumvent the range-resolution trade-offs associated with standard ranging methods.

Numerous innovations for ranging have been provided in the prior art that are adapted to be used. Even though these innovations may be suitable for the specific individual purposes to which they address, they would not be suitable for the purposes of the present invention as heretofore described.

While the concepts of TOF and phase-based ranging have been taught using various combinations of an interrupted burst of energy at a carrier frequency, modulating this carrier, and using various coherent demodulation methods on the resultant signal, the advantages and implications of a new ranging method that combines the best features of each of these has not been previously taught nor appreciated.

SUMMARY OF THE INVENTION

The present invention relates generally to methods and apparatus for measuring any combination of distance to a target, velocity of the target, and composition of the target, which can be a solid, liquid or vapor. Transceiver energies used with the method may be in the acoustic, optical, x-ray, radio-frequency, microwave, millimeter-wave or other electromagnetic energy bands.

These and other objects of the invention to be described or made apparent hereafter, are accomplished by employment of a coherent, quasi-continuous interrupted burst of acoustic or electromagnetic radiation (for example, emission from a gated, modulated laser, where the laser wavelength provides a carrier signal for a burst of a particular modulation frequency). This provides an encoding pattern necessary for achieving high precision, electronic coherent ranging at short to long distances using transmissions consisting of one or more individual modulation envelopes. Using the example of laser ranging, a burst of coherently modulated light is emitted from the laser transmitter. The RF modulation imposed on this optical carrier provides a means for obtaining high absolute precision in range measurement, while measurement of the delay from burst transmission to reception eliminates ambiguity that might otherwise arise from aliasing of the RF modulation. Hence, accurate ranging at high precision can be achieved using one or more transmitter bursts.

The method utilizes electronic coherence means for signal encoding and decoding, which are generally more rugged than direct optical means used in prior art.

The equipment needed to obtain coherent performance is less complex than that needed for conventional coherent TOF or coherent CW ranging means, consisting of an energy source, modulation generator, high speed detector, and bandwidth limited processor system. The last can be implemented electronically or by using mathematical post-processing algorithms on captured data. However, because pertinent ranging information is encoded directly into the burst return signal at the modulation frequency, standard electronic methods for coherent demodulation (such as heterodyne and superheterodyne demodulation) can be readily employed. This provides an inherently simple means for obtaining high sensitivity and good noise suppression. Furthermore, because such demodulation methods are sensitive to phase of the target return, relative velocity information is easily extracted from the detected response as a function of time. Also, by use of suitable signal processing methods, multiple transmitter carrier frequencies (such as multiple different laser wavelengths) can be utilized simultaneously for tracking multiple targets or for measuring multiple aspects of one or more targets, such as composition.

The method taught herein is extremely flexible, and as such is applicable to numerous other implementations beyond that exemplified by a simple interrupted burst, including use with standard CW methods and apparatus. The modulation schemes taught here can be easily implemented with such approaches to afford immediate improvement in performance of such CW systems. Likewise, coherent burst modulation methods are compatible with conventional TOF approaches, where their use would improve both distance resolution and sensitivity.

Accordingly, it is an object of the present invention to teach a method and apparatus useful for instantaneously obtaining high precision ranging measurements at both short and long range.

It is another object of this invention to provide a means for implementing this ranging method with virtually any electromagnetic transmitter source, using simple, rugged and inexpensive electronic means.

It is another object of this invention to provide a simple means for instantaneous measurement of target velocity.

It is another object of this invention to provide a simple means for instantaneous measurement of target composition.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—general method for simultaneous measurement of coarse and fine distance (10)

12—reference signal (12)

14—transmitter signal (14)

16—high-frequency modulated electromagnetic radiation (16)

18—phase-coherent (18)

20—receiver signal (20)

22—high-frequency modulated electromagnetic radiation (22)

24—delay time (24)

26—phase shift (26)

28—frequency synthesizer (28)

30—coherent burst drive signal (30)

32—laser transmitter (32)

34—target (34)

36—receiver (36)

38—electronic representation (38)

40—scattered light (40)

42—processor circuit (42)

44—timing reference signal (44)

46—drive signal (46)

48—coherent burst modulation pattern (48)

50—diode laser (50)

52—modulation unit (52)

54—output (54)

56—laser (56)

58—transmitter gain medium (58)

60—high reflector (60)

62—output coupler (62)

64—intra-cavity gain (64)

66—master oscillator (66)
68—mixer (68)
70—gating pulse (70)
72—pulse generator (72)
74—bandpass filter (74)
76—bandwidth limited signal (76)
78—power splitter (78)
80—first of two equal components signal (80)
82—second of two equal components signal (82)
84—first of two demodulators (84)
86—second of two demodulators (86)
88—first secondary reference signal (88)
90—second secondary reference signal (90)
92—phase splitter (92)
94—first signal thus issued (94)
96—second signal thus issued (96)
98—real phase component (98)
100—imaginary phase component (100)
102—demodulated signal (102)
104—signal processor (104)
106—detected signal (106)
108—bandwidth limited response (108)
110—predicted phase shift (110)
112—actual laser ranging data (112)
114—receiver signal (114)
116—burst of modulated energy (116)
118—modulation frequency (118)
120—response function (120)
122—phase envelope (122)
124—slope (124)
126—first of multiple laser transmitters (126)
128—second of multiple laser transmitters (128)
130—first of multiple transmitter wavelengths (130)
132—second of multiple transmitter wavelengths (132)
134—first of multiple drive circuits (134)
136—second of multiple drive circuits (136)
138—first of multiple separate drive signals (138)
140—second of multiple separate drive signals (140)
142—first of multiple coherent bursts (142)
144—second of multiple coherent bursts (144)
146—first of multiple modulation frequencies (146)
148—second of multiple modulation frequencies (148)
150—first of multiple laser energies (150)
152—second of multiple laser energies (152)
154—first of multiple encoded burst patterns (154)
156—second of multiple encoded burst patterns (156)
158—remote target (158)
160—scattered light (160)
162—summation signal (162)
164—single receiver (164)
166—electronic representation (166)
168—processor circuit (168)
170—first of multiple modulation frequency reference signals (170)
172—second of multiple modulation frequency reference signals (172)
174—single laser transmitter (174)
176—single wavelength (176)
178—drive signal (178)
180—first of multiple drive signals (180)
182—second of multiple drive signals (182)
184—mixing circuit (184)
186—first of multiple drive circuits (186)
188—second of multiple drive circuits (188)
190—first of multiple coherent bursts (190)
192—second of multiple coherent bursts (192)
194—first of multiple modulation frequencies (194)
196—second of multiple modulation frequencies (196)
198—multiple frequency encoding pattern (198)
200—laser energy (200)
202—encoded burst pattern (202)
204—remote target (204)
206—scattered light (206)
208—encoded burst pattern (208)
210—single receiver (210)
212—electronic representation (212)
214—processor circuit (214)
216—first of multiple modulation frequency reference signals (216)
218—second of multiple modulation frequency reference signals (218)

DESCRIPTION OF THE PREFERRED EMBODIMENT

For clarity of illustration throughout the following descriptions, an optical ranging apparatus utilizing amplitude modulated laser energy is represented in detail. However, it must be noted that the method employed in construction and operation of the example optical apparatus can be easily utilized with other forms of electromagnetic radiation, including conventional radio-frequency, microwave, millimeter-wave, x-ray, and other electromagnetic energies, as well as with acoustic energy. In accordance with any of these potential specific embodiments of the invention, the ranging method taught herein is based on measurement of the finite time required for a transmitter signal to traverse the distance separating the transmitter from a target of interest, then traverse an essentially equivalent distance back from the target to a receiver that is substantially co-located with the transmitter. It is assumed that interaction of transmitted electromagnetic energy with the target is virtually instantaneous (occurring on a time frame $<10^{-15}$ s) relative to the minimum measurement period of interest (which is typically $\geq 10^{-12}$ s), and that this interaction occurs as a result of reflection, scatter, or other means of interaction of the transmitted energy with the target. Thus, it is the primary object of the present invention to teach an improved method and apparatus capable of measuring distance to a remote target with greater accuracy, precision, and speed than that possible using prior art.

Figure 1:
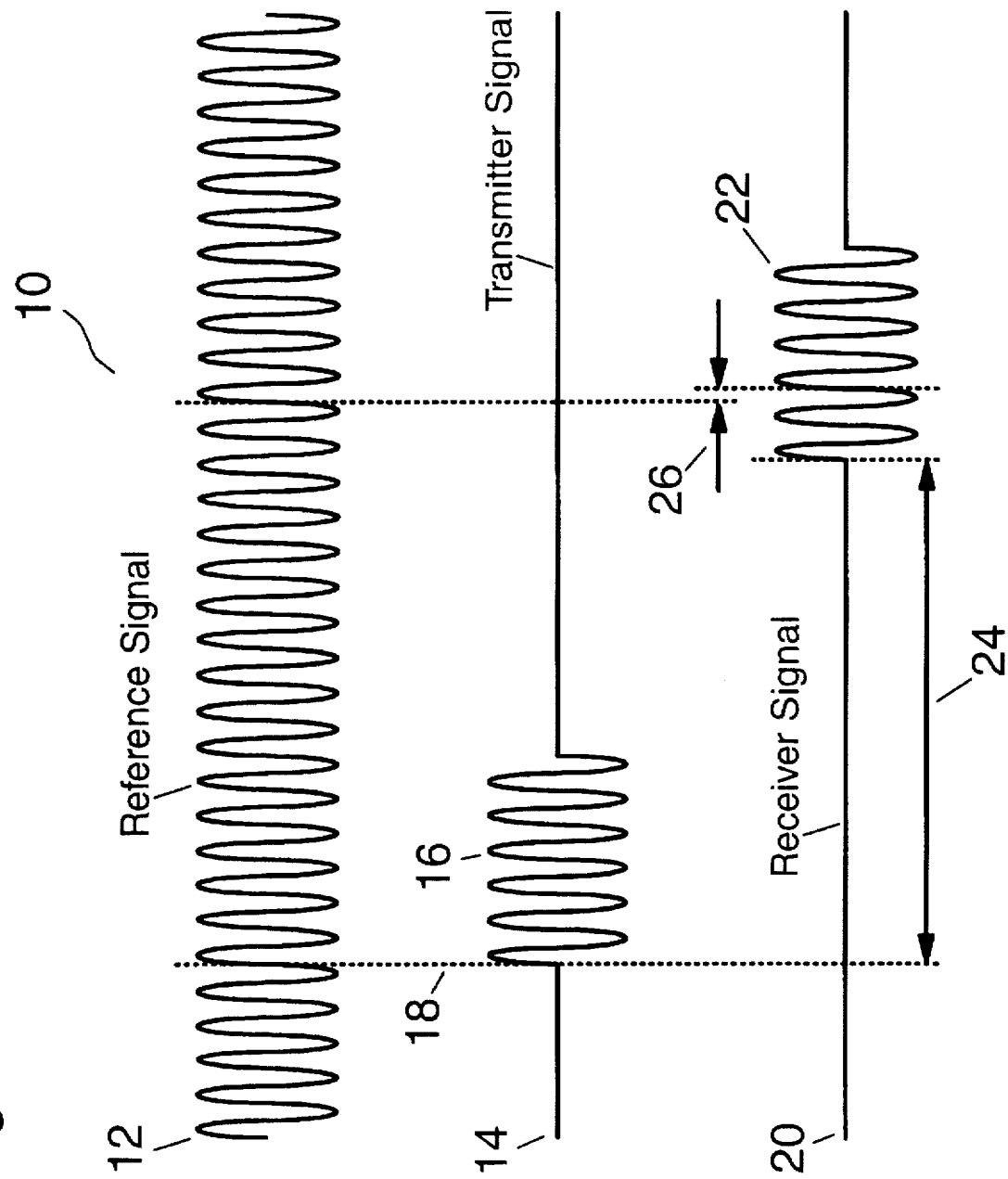
FIG. 1 shows a general method for simultaneous measurement of coarse and fine distance.

First referring to FIG. 1 which shows a general method for simultaneous measurement of coarse and fine distance (10) having the following features: reference signal (12), transmitter signal (14), high-frequency modulated electromagnetic radiation (16), phase-coherence (18), receiver signal (20), high-frequency modulated electromagnetic radiation (22), delay time (24), and phase shift (26).

A general method for simultaneous measurement of coarse and fine distance (10) comprises a reference signal (12) used in the generation of a transmitter signal (14). The transmitter signal (14) consists of an interrupted burst of high-frequency modulated electromagnetic radiation (16), where the high-frequency modulation is phase-coherent (18) with the reference signal (12). This burst is exemplified by an amplitude-modulated burst of laser light, where, for example, the reference signal (12) may consist of a stable RF frequency of 100 MHz (or $10^8$ Hz), that is encoded onto an optical carrier of 785 nm (or $3 \times 10^{14}$ Hz) to produce the transmitter signal (14). The transmitter signal (14) is directed onto a target that is to be ranged. Upon interaction of the transmitter signal (14) with the target, a receiver signal (20) is obtained that consists of a similar burst of high-frequency modulated electromagnetic radiation (22) that is temporally delayed from the transmitter signal (14) by some delay time (24). The modulation pattern on this receiver signal (20) also exhibits a phase shift (26) relative to the reference signal (12). The delay time (24) is used to accurately determine the approximate distance to the target, while the phase shift (26) is used to refine the precision on this measurement, according to the relationship:

$$R = c \left[ \frac{t}{2} + \frac{\delta}{2f} \right] \quad (1)$$

where R is the distance from the transceiver to the target, c is the speed of light, t is the delay time (24), $\delta$ is the fractional phase shift (26), and $f$ is the frequency of the reference signal (12). This implies that range resolution is given by $\Delta R = \Delta \delta c / 2f$. Also, since t represents the number of elapsed high-frequency modulation cycles occurring between transmission and detection of a return signal, it is only necessary to measure the value of t to a precision of $\pm 1/f$, while it is relatively easy to measure $\delta$ to better than one part in 100 ($\Delta \delta = 0.01$). Hence, by use of an appropriate modulation frequency, very precise single shot measurements are possible at ranges far in excess of the wavelength of the modulation source. For example, using $f=100$ MHz, $\Delta R=15$ cm is predicted, assuming $\Delta \delta = 0.01$. In practice, phase measurement uncertainty can be easily reduced to approximately 0.001, improving precision by an order of magnitude. This approach decouples the range/resolution relationship of conventional coherent ranging approaches, enabling a high level of performance to be observed for both proximal and distal range, even for repetitive measurements. This is the case since $R_{AMB}=c/(2\ BRF)$, where BRF is the burst repetition frequency, which is not dependent on $\Delta \delta$ or $f$ (which determine $\Delta R$). Note, for example, that if BRF=10 kHz, $R_{AMB}=15$ km, while $\Delta R \leq 15$ cm for all ranges less than $R_{AMB}$.

Figure 2:
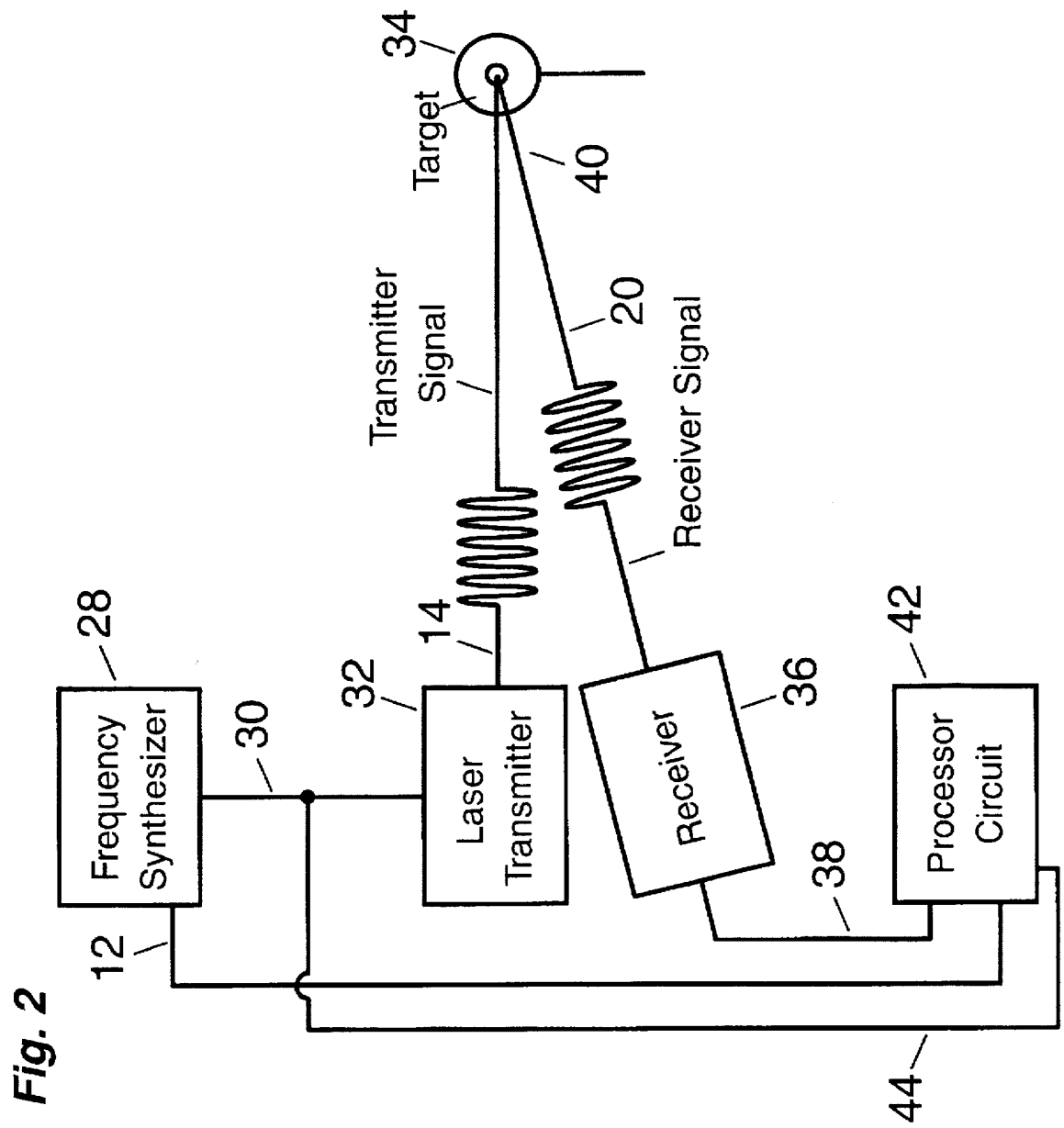
FIG. 2 shows a general method for implementing simultaneous measurement of coarse and fine distance.

Secondly referring to FIG. 2, which shows a general method for implementing simultaneous measurement of coarse and fine distance having the following features: phase reference signal (12), transmitter signal (14), receiver signal (20), frequency synthesizer (28), coherent burst drive signal (30), laser transmitter (32), target (34), receiver (36), electronic representation (38), scattered light (40), processor circuit (42), timing reference signal (44).

A frequency synthesizer (28) provides a coherent burst drive signal (30) to a laser transmitter (32). In response to the coherent burst drive signal (30), the laser transmitter (32) emits a transmitter signal (14) that is directed onto a target (34). A receiver signal (20) scattered from the target (34) is collected by a receiver (36), that provides an electronic representation (38) of the scattered light (40) to a processor circuit (42). The processor circuit (42) obtains a timing reference signal (44) and phase reference signal (12) from the frequency synthesizer (28). These signals are used in the processor circuit (42) to solve for range according to EQN. (1).

Performance of the general method for simultaneous measurement of coarse and fine distance was verified using a diode laser transmitter (32) whose output was directly modulated using a coherent burst drive signal (30) produced by a digital frequency synthesizer (28). The transmitter signal (14) thus produced was used to range a target (34) at various distances up to 300 m. A photomultiplier tube and camera lens served as the receiver (36) for the back scattered light (40) from the target (34). The electronic representation (38) thus produced was captured and processed using a processor circuit (42). Successful operation using single bursts consisting of transmitted energies in the range of 1 µJ was demonstrated under daylight illumination conditions.

Figure 3:
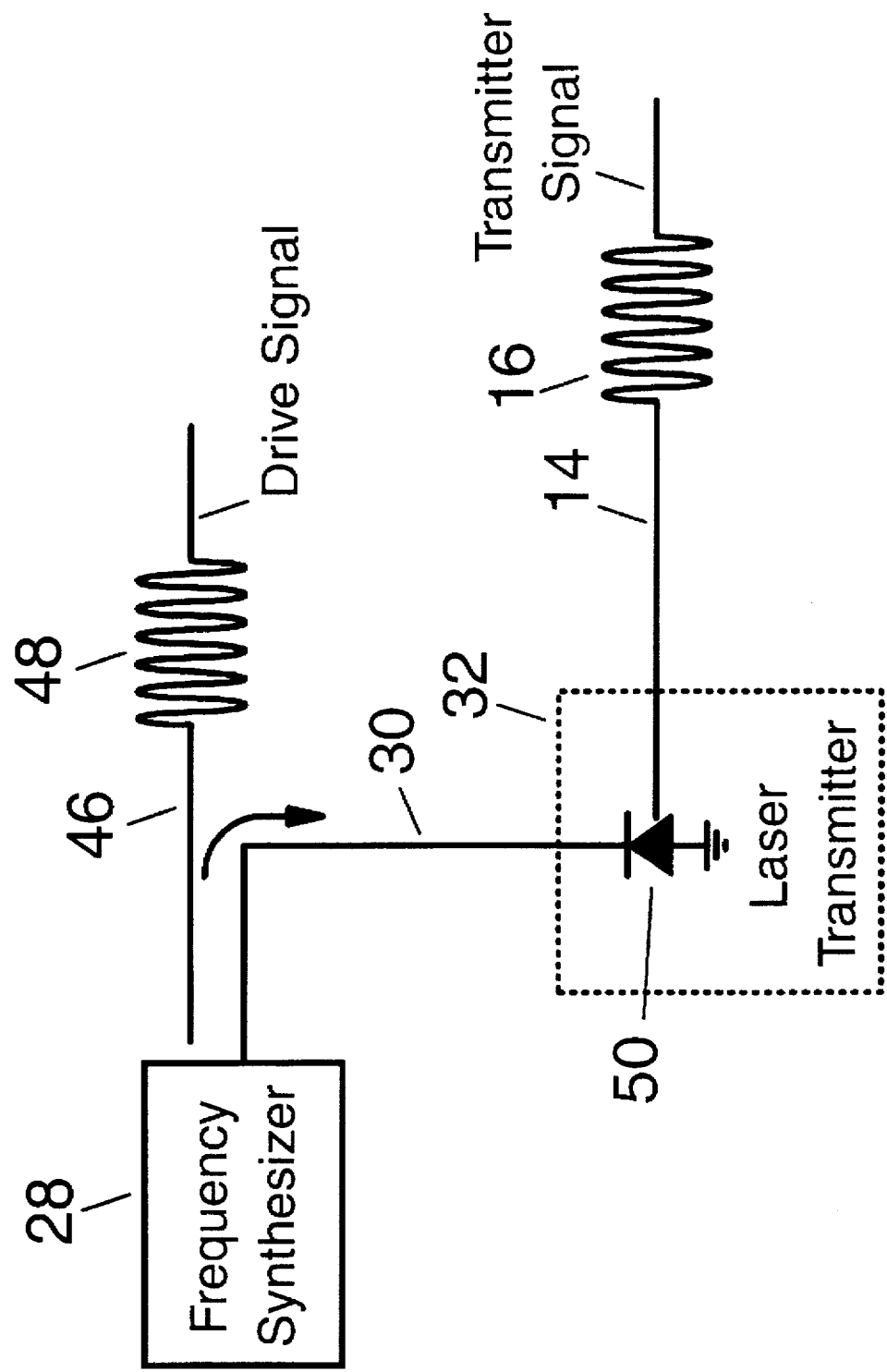
FIG. 3 is a pictorial schematic showing a transmitter that is configured for direct modulation of a transmitter signal.

Thirdly, referring to FIG. 3 which is a pictorial schematic for describing a transmitter sub-assembly that is configured for direct modulation of output energy having the following features: transmitter signal (14), high-frequency modulated electromagnetic radiation (16), frequency synthesizer (28), coherent burst drive signal (30), laser transmitter (32), drive signal (46), coherent burst modulation pattern (48), and diode laser (50).

Direct transmitter modulation is effected when the coherent burst drive signal (30) of a frequency synthesizer (28) is applied as a drive signal (46) to the laser transmitter (32). This drive signal (46) is encoded with a coherent burst modulation pattern (48). The drive signal (46) powers a diode laser (50) inside the laser transmitter (32), which emits a transmitter signal (14) consisting of high-frequency modulated electromagnetic radiation (16) in direct response to the drive signal (46). This method provides a simple means for producing a transmitter signal (14) that is amplitude modulated.

Figure 4:
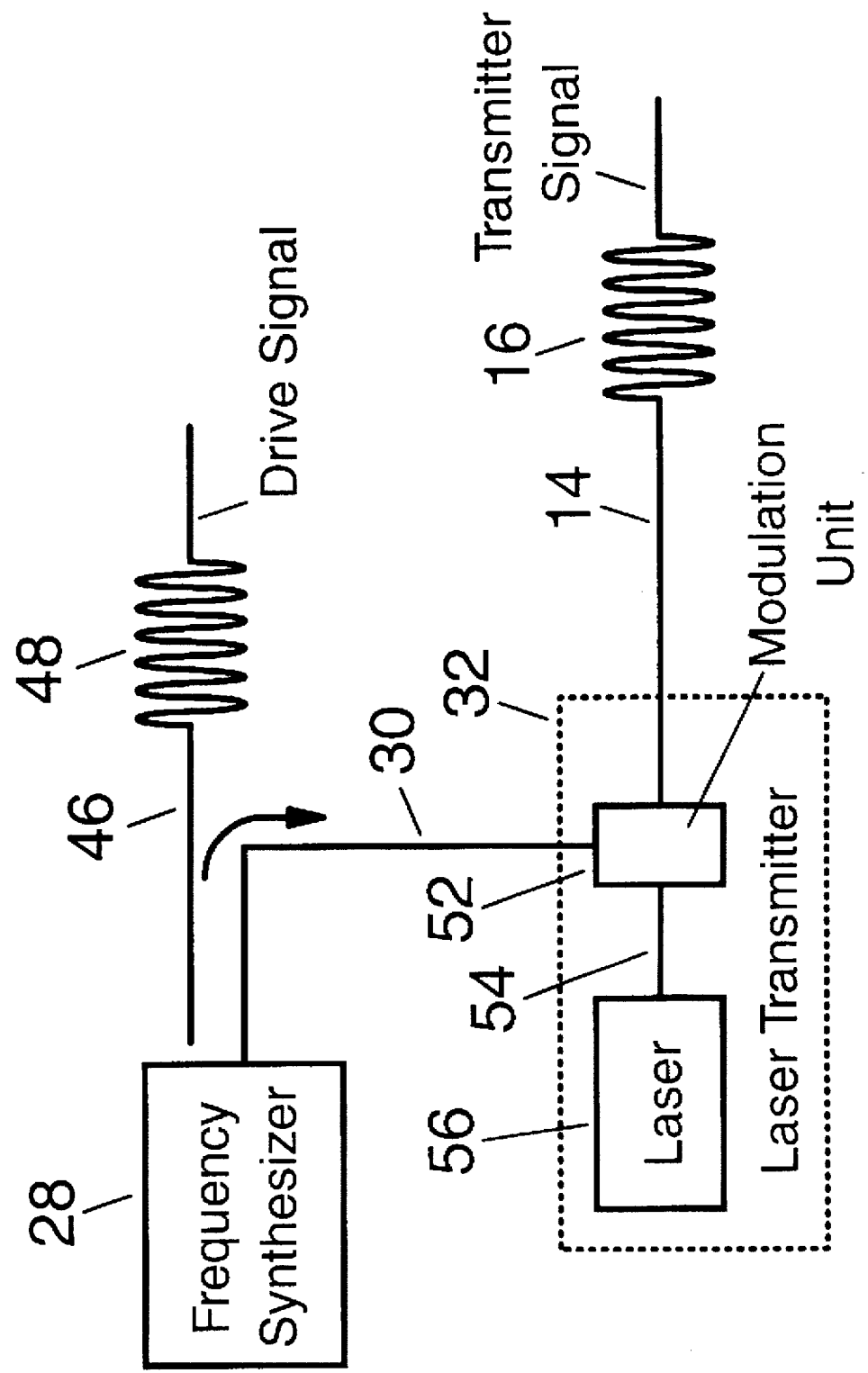
FIG. 4 is a pictorial schematic for describing a laser transmitter that is configured for extra-cavity modulation of the transmitter signal.

Referring now to FIG. 4 which is a pictorial schematic for describing a transmitter sub-assembly that is configured for extra-cavity modulation of output energy having the following features: laser transmitter (32), drive signal (46), modulation unit (52), output (54), and laser (56).

A drive signal (46) stimulates a modulation unit (52) contained within the laser transmitter (32). This modulation unit (52) serves to modulate the output (54) of a laser (56) that is operated in a substantially continuous manner. The output (54) of the laser (56) is thus encoded in direct response to the drive signal (46) applied to the modulation unit (52). This method provides a simple means for producing a transmitter signal (14) that is amplitude or phase modulated, and can be made functional with virtually any electromagnetic source (including diode lasers, ion lasers, Q-switched lasers, and microwave sources).

Figure 5:
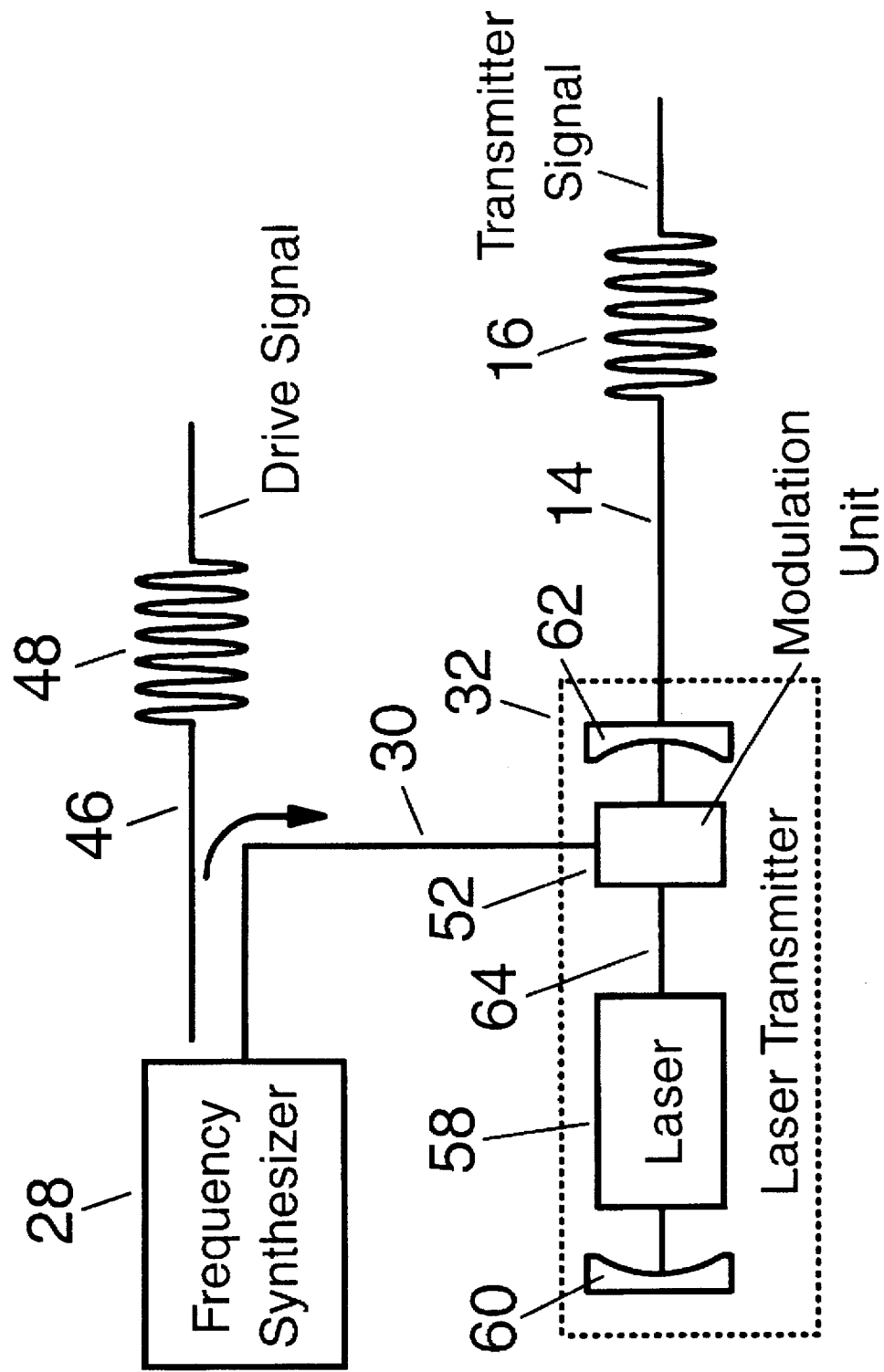
FIG. 5 is a pictorial schematic for describing a laser transmitter that is configured for intra-cavity modulation of the transmitter signal.

Referring now to FIG. 5 which is a pictorial schematic for describing a transmitter sub-assembly that is configured for intra-cavity modulation of output energy having the following features: transmitter signal (14), high-frequency modulated electromagnetic radiation (16), laser transmitter (32), drive signal (46), modulation unit (52), transmitter gain medium (58), high reflector (60), output coupler (62), and intra-cavity gain (64).

The similar drive signal (46) stimulates a modulation unit (52) contained in the laser transmitter (32). This modulation unit (52) is located adjacent to the transmitter gain medium (58), both of which are located along the principal axis of an oscillator cavity defined by a high reflector (60) and an output coupler (62). Intra-cavity gain (64) is controlled by varying the loss characteristics of the modulation unit (52). Transmitter signal (14) of the laser transmitter (32) consists of high-frequency modulated electromagnetic radiation (16) in direct response to the drive signal (46) applied to the modulation unit (52). This method provides a simple means for producing a transmitter signal that is amplitude or phase modulated. It has the additional advantage that peak output is emitted when the modulation unit (52) is operated, maximizing efficiency in the use of intra-cavity gain (64).

Figure 6:
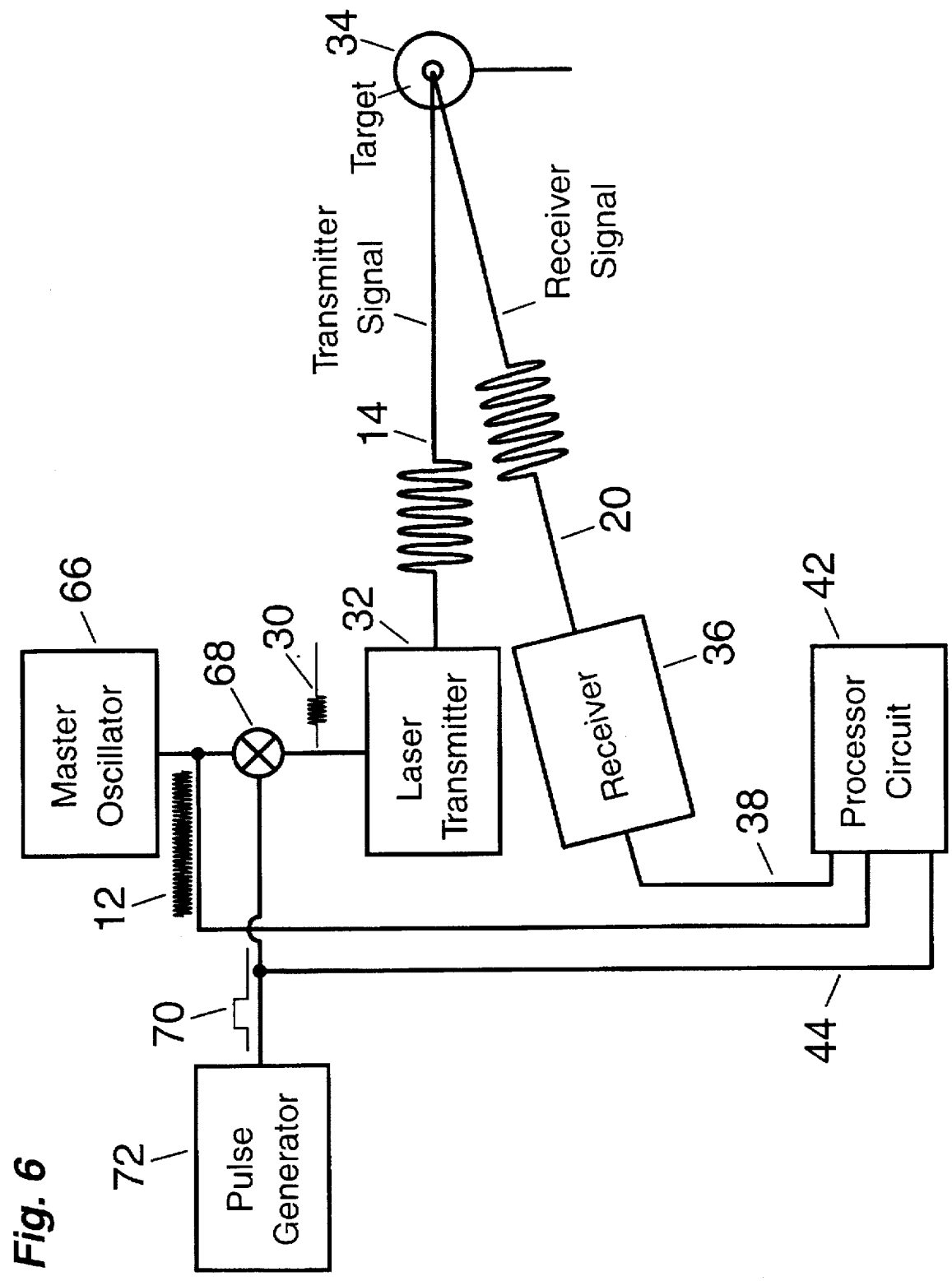
FIG. 6 is a pictorial schematic for describing an alternate invention assembly and operation wherein a gated oscillator is employed for coherence control.

Referring now to FIG. 6 which is a pictorial schematic for describing an alternate invention assembly and operation wherein a gated oscillator is employed for coherence control having the following features: reference signal (12), transmitter signal (14), receiver signal (20), coherent burst drive signal (30), laser transmitter (32), target (34), receiver (36), processor circuit (42), timing reference signal (44), master oscillator (66), mixer (68), gating pulse (70), and pulse generator (72).

A master oscillator (66), such as a temperature controlled crystal oscillator, provides a continuous reference signal (12) to a mixer (68). The mixer (68) serves as a fast switch to gate the reference signal (12) under stimulation of a gating pulse (70) derived from a pulse generator (72). The coherent burst drive signal (30) thus produced is used to control the transmitter signal (14) of the laser transmitter (32) synchronously with the gating pulse (70). The transmitter signal (14) interacts with a target (34) to produce a receiver signal (20) that is detected by a receiver (36) and converted into an electronic representation (38) that is provided to a processor circuit (42) as described in FIG. 2. The gating pulse (70) emanating from the pulse generator (72) also serves as a timing reference signal (44) for the processor circuit (42). This embodiment eliminates the need for a dedicated frequency synthesizer (28) (as shown in FIG. 2), replacing it with the much less complex arrangement consisting of a pulse generator (72) and master oscillator (66).

Figure 7:
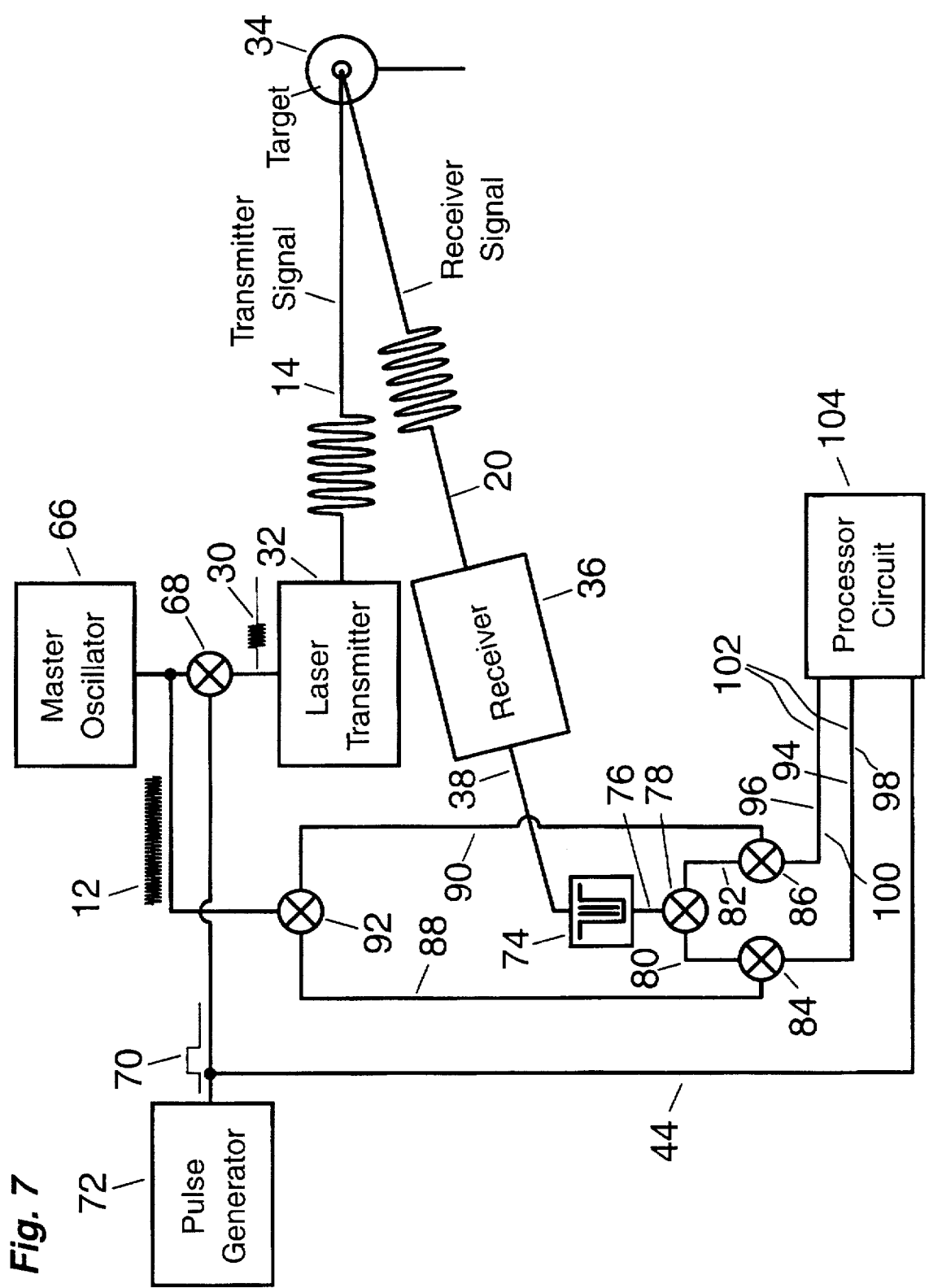
FIG. 7 is a pictorial schematic for describing a general method for simultaneous measurement of coarse and fine distance wherein a heterodyne detection sub-assembly is used for extraction of range information.

Referring now to FIG. 7, which shows a schematic of the principal componentry necessary for electronic heterodyne demodulation of the transceiver signal having the following features: reference signal (12), transmitter signal (14), receiver (36), gating pulse (70), pulse generator (72), bandpass filter (74), bandwidth limited signal (76), power splitter (78), first of two equal components signal (80), second of two equal components signal (82), first of two demodulators (84), second of two demodulators (86), first secondary reference signal (88), second secondary reference signal (90), phase splitter (92), first signal thus issued (94), second signal thus issued (96), real phase component (98), imaginary phase component (100), demodulated signal (102), and signal processor (104).

The bandwidth of the electronic representation (38) from the receiver (36) is substantially limited to a band of frequencies closely distributed about the reference signal (12) by electronic filtering that is effected in a bandpass filter (74). (The transmitter signal (14) is produced and received as described previously in FIG. 6.) The bandwidth limited signal (76) emanating from the bandpass filter (74) is directed into a power splitter (78), which divides the bandwidth limited signal (76) into a first of two equal components signal (80) and a second of two equal components signal (82). These first of two equal components signal (80) and second of two equal components signal (82) are issued to a first of two demodulators (84) and second of two demodulators (86), where they are mixed with a first secondary reference signal (88) and a second secondary reference signal (90) derived from the reference signal (12). These first secondary reference signal (88) and a second secondary reference signal (90) are made to differ in phase by 90° ($\pi/2$ radians) by processing of the reference signal (12) in a phase splitter (92). The first signal thus issued (94) and second signal thus issued (96) by the first of two demodulators (84) and second of two demodulators (86) are in this way made to represent the real phase component (98) and imaginary phase component (100) of the demodulated signal (102). The signal processor (104) uses the real phase component (98) and imaginary phase component (100) signals to determine the phase of the demodulated signal (102) relative to the reference signal (12) and the temporal delay of the demodulated signal (102) relative to the gating pulse (70).

Figure 8:
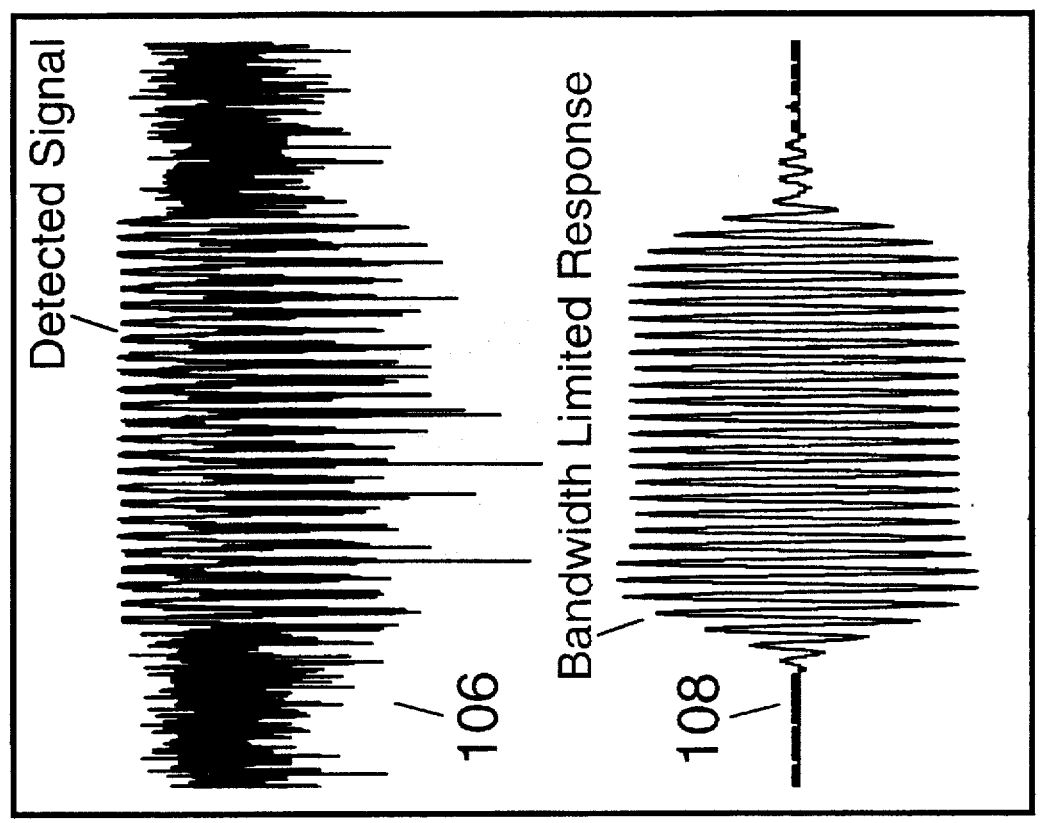
FIG. 8 is a graph which illustrates the effect of bandwidth-limited detection.

Referring now to FIG. 8 which is a graph which illustrates the effect of bandwidth-limited detection having the following features: detected signal (106), and bandwidth limited response (108).

Bandwidth limiting of the detected signal using a bandpass filter affords significant enhancements in noise rejection. For a single coherent burst consisting of 1 µJ of laser energy at 785 nm wavelength that was modulated at 100 kHz, a detected signal (106) was obtained under ambient lighting conditions from a target located 30 m distant from the transceiver. Use of electronic bandpass filtering on this signal provided a bandwidth limited response (108) obtained under otherwise similar conditions that demonstrated a greater than 100-fold improvement in signal-to-noise ratio. Note that similar signal-to-noise improvements can be achieved through application of mathematical bandpass filtering algorithms (such as a 101-pole, finite impulse response digital filter) on the detected signal (106).

To compare theoretical signal-to-noise-ratio (SNR) characteristics for the coherent burst method with TOF laser ranging, assume that each system transmits 1 µJ of laser radiation and collects $10^{-12}$ of the transmitted photons, and that these collected photons are detected using a standard photomultiplier tube (PMT) with $7.4 \times 10^5$ A/W radiant anode sensitivity and 3 nA dark current (such as the Hamamatsu R948). This would translate into the following signal levels on the PMT:

TOF: a 10 ns pulse produces 100 pW peak power at the detector, or 74 µA current

Coherent Burst: a 10 µs coherent burst produces 100 fW peak power at the detector, or 74 nA current Next, assume that these signals are converted to voltage in a low noise amplifier with a gain of 100, an input impedance of 50 Ω, and an input noise level of 5 nV/√Hz. If the TOF amplifier bandwidth is 500 MHz, while the coherent burst bandwidth is limited to 1 kHz, this would translate into the following signal ($V_{signal}$) and noise ($V_{noise}$) levels at the output of the amplifier:

TOF: $V_{signal}$ = (74 µA · 50Ω · 100) = 370 mV $V_{noise}$ = (5 nV/$\sqrt{Hz}$ · $\sqrt{500\,MHz}$ · 100) = 11 mV SNR = $V_{signal}/V_{noise}$ = (370 mV/11 mV) = 34

Coherent Burst: $V_{signal}$ = (74 nA · 50Ω · 100) = 370 mV $V_{noise}$ = (5 nV/$\sqrt{Hz}$ · $\sqrt{1\,kHz}$ · 100) = 20 µV

SNR = (370 µV/20 µV) = 18

Hence, roughly similar SNR performance appears to be achieved under these ideal measurement scenarios. However, if there is any stray light present in the detected signal (for example from ambient light), the incoherent TOF system will detect this additional noise source, while the coherent burst system will strongly reject this incoherent interference. For example, assume that daylight ambient leakage produces a background signal of 100 µA on the PMT, which translates to 500 mV of background for the TOF measurement, but only approximately 1 µV for the coherent burst measurement. Since optical shot noise from this background, B, is equal to the square root of the total photons detected, and SNR≈S/(S+B)$^{1/2}$, for the TOF approach this background level yields a SNR of roughly 0.4, while the SNR for the coherent burst approach is still approximately 18. This clearly demonstrates a major advantage of narrow band detection, namely rejection of background interference. In fact, the coherent burst method would still achieve a similar SNR even if this background level increased by an additional factor of 100.

Figure 9:
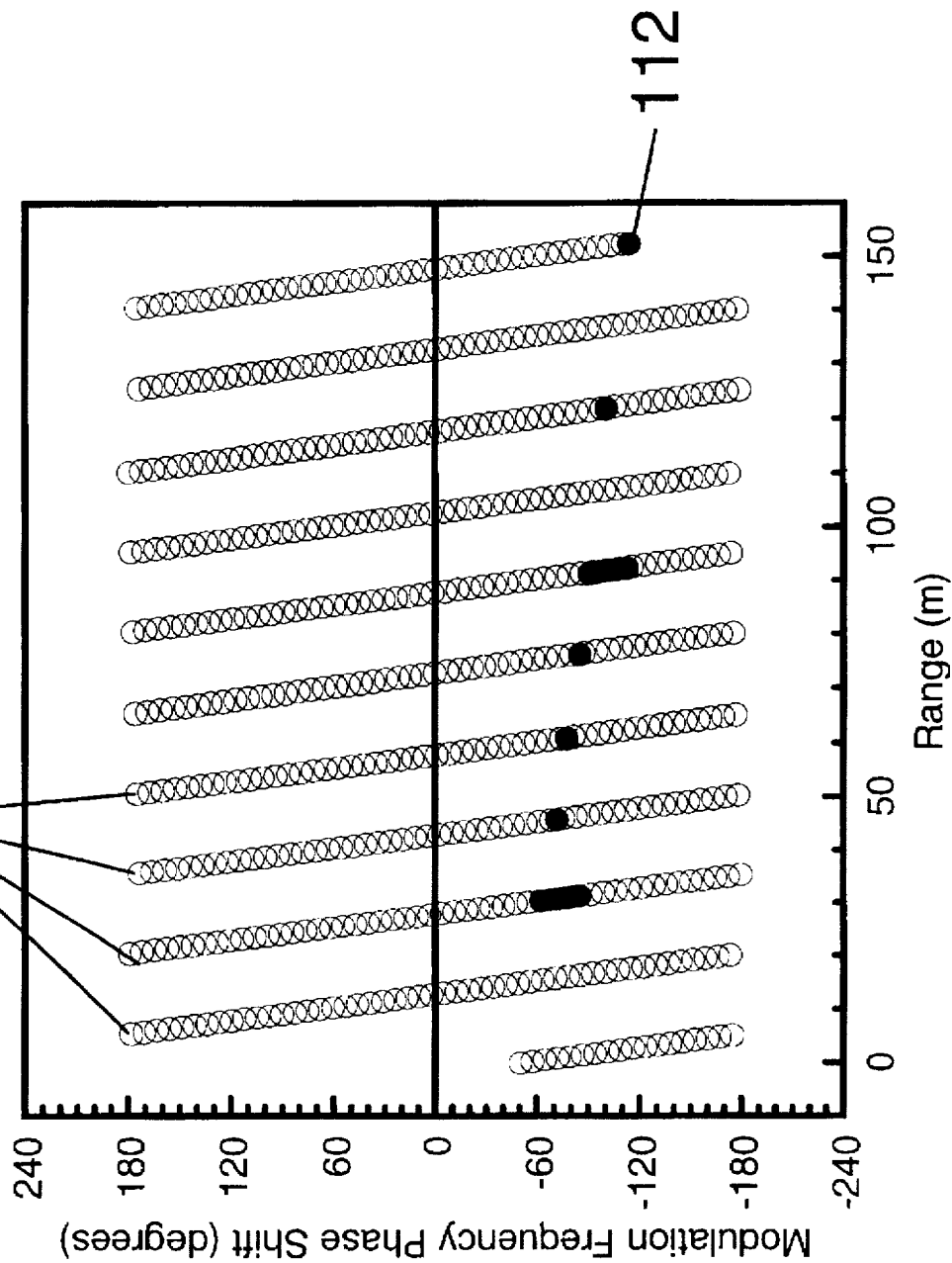
FIG. 9 is a graph which illustrates the range ambiguity problem characteristic of conventional modulation methods and the resolution performance improvements characteristic of the coherent burst method.

High resolution ranging using the coherent burst method is demonstrated for a variety of target ranges in FIG. 9. Here, the predicted phase shift (110) for the modulation frequency is plotted for example ranges as open circles. Actual laser ranging data (112) at a number of measured ranges are shown as filled circles. For the data in FIG. 9, a 10 µs long coherent burst consisting of a 10 MHz sinusoidal modulation (f=10 MHz) was transmitted, such that ΔR<0.1 m; note that $R_{AMB}$≥1.5 km under these conditions, which is much greater than the range of data plotted (150 m). Note also that the maximum measurable range, $R_{MAX}$, will be determined by detector sensitivity and signal-to-noise ratio, and may be greater than or less than $R_{AMB}$. In contrast, when using conventional CW methods, a 10 MHz modulation frequency yields ΔR<0.1 m, with $R_{AMB}$=15 m; for TOF methods, where τ would typically be 10 ns, if PRF=100 kHz (¹/₁₀ µs) then 66 R=1.5 m and $R_{AMB}$=1.5 km. FIG. 9 clearly illustrates the way in which a high frequency waveform will experience aliasing (or phase wrapping) as range is varied across distances greater than the ambiguity interval determined by the modulation frequency (λ/2, or 15 m in this example), as exemplified by the degeneracy seen in the relationship between range and phase shift; this illustrates the poor $R_{AMB}$ characteristics of the CW method. By use of EQN. (1), this degeneracy is eliminated when employing the coherent burst ranging method, wherein each range is represented by an unique combination of phase shift and temporal delay. Hence, the coherent burst method achieves ranging precision performance characteristic of CW methods simultaneously with the long unambiguous range characteristic of TOF methods.

Because the coherent burst ranging method utilizes a modulated, quasi-CW transmitter, it is inherently far safer than competing TOF methods that use intense transmitter bursts having extremely high peak powers. Also, because highly precise ranging measurements can be accurately obtained using a single coherent burst modulation cycle, the duration and total transmitted power can be far less than that needed for an equivalent measurement using CW methods. Assume one wishes to range a target at a distance of 1 km, with a precision of 0.01 m. Using the coherent burst method, f=100 MHz with a burst duration of 50 µs and a BRF=10 kHz would be appropriate measurement conditions. To achieve similar ΔR performance, the TOF method would require use of a pulse width τ=67 ps. And to avoid range ambiguity at 1 km, CW methods would require sequential or swept transmission of approximately five discrete modulation frequencies; under ideal conditions, the average power and dwell time at each of these frequencies would have to be equivalent to that needed for a complete coherent burst measurement.

TABLE I

Comparison of average power, total power, and peak power for equivalent TOF, CW and coherent burst ranging measurements.

| Parameter | TOF | CW | Coherent Burst |
|---|---|---|---|
| Average Transmitter Power | 10 mW | 10 mW | 10 mW |
| Transmitter Cycle Duration | 67 ps | 50 µs | 50 µs |
| Minimum Transmitter Cycles | 1 | 5 | 1 |
| Total Transmission Time | 67 ps | 250 µs | 50 µs |
| Energy/Transmitter Cycle | 1 mJ | 1 µJ | 1 µJ |
| Total Energy/Transmission | 1 mJ | 5 µJ | 1 µJ |
| Peak Transmitter Power | $15 \times 10^6$ W | 0.04 W | 0.04 W |

Note that the examples given in TABLE I are shown such that each method uses the same average power for the laser transmitter, with the TOF transmitter PRF=10 Hz (a typical value) and a depth of modulation for the CW and coherent burst methods of 100%. In practice, the CW and coherent burst methods can provide detection sensitivities comparable to that of the TOF method using 10–1000 fold lower average powers, due to their compatibility with bandwidth limited detection schemes. It is clear that due to the vastly lower peak powers produced, the coherent burst method is far safer than the TOF method. Even if one were to assume that it was necessary to use the same total energy per transmission for the two methods, the peak power in this example for the coherent burst method would still be over 100,000-fold smaller than that for the TOF method. Hence, for many applications, inherently eye-safe ranging is possible because of the low peak powers needed with coherent burst systems.

In addition to the ranging, signal-to-noise, and safety advantages of the method and apparatus taught herein, a number of alternate versions and uses for the invention will be readily obvious to those of normal skill and training, including the instantaneous measurement of velocity and the simultaneous tracking of multiple target phenomena using multi-frequency transception. Because demodulation methods such as those described in FIG. 7 are inherently sensitive to the phase of the target return signal, changes in target range during the brief period of interaction with a coherent burst transmission will result in a detected phase signal that varies as a function of time. The slope of this temporal phase response will be proportional to velocity, while any change in this slope as a function of time will be proportional to change in velocity.

Figure 10:
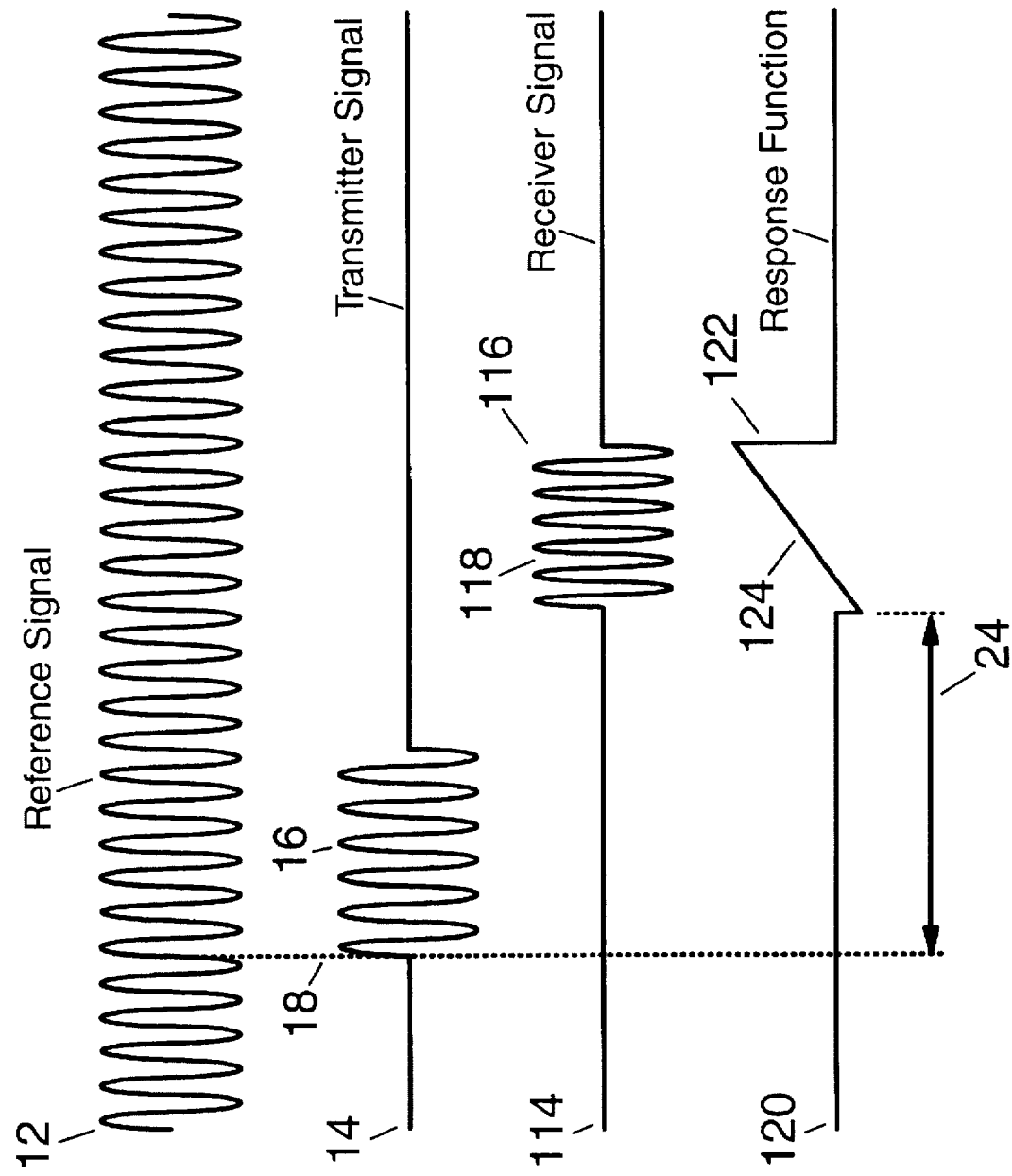
FIG. 10 is a pictorial representation of the general method for enabling use of coherent burst modulation ranging for measurement of the velocity of a moving target.

Now referring to FIG. 10 which is a pictorial representation of the method for enabling use of coherent burst modulation ranging for measurement of the velocity of a moving target. The method has the following features: reference signal (12), transmitter signal (14), high-frequency modulated electromagnetic radiation (16), phase coherence (18), delay time (24), receiver signal (114), burst of modulated energy (116), modulation frequency (118), response function (120), phase envelope (122), and slope (124).

A reference signal (12) is used to generate a transmitter signal (14), consisting of an interrupted burst of high-frequency modulated electromagnetic radiation (16) that is phase-coherent (18) with the reference signal (12), comparable to that shown in FIG. 1. The transmitter signal (14) is directed onto a remote target whose velocity and range are to be determined. Upon interaction of the transmitter signal (14) with the target, a receiver signal (114) is obtained that consists of a burst of modulated energy (116) with a modulation frequency (118) that is slightly different than that of the reference signal (12). This shift in modulation frequency (118) arises from motion of the target relative to the transceiver during the period of interaction with the high-frequency modulated electromagnetic radiation (16). When the receiver signal (114) is demodulated using the reference signal (12), a response function (120) is obtained that consists of a phase envelope (122), representative of the correlation between the modulation frequency (118) of the receiver signal (114) and the reference signal (12). The slope (124) of this phase envelope (122) is proportional to radial velocity of the target. Furthermore, the elapsed delay time (24) between transmission and reception of the phase envelope (122) provides a measure of t while the average magnitude of the phase envelope (122) provides a measure of δ. These data allow target range to be determined according to EQN (1).

An example application for the method shown in FIG. 10 is Doppler laser ranging, wherein the phase shift in the receiver signal (114) is used to measure wind velocity or speed of a moving target. In prior art, complex optical heterodyne methods have been needed to perform such measurements. The invention described herein eliminates the need for such complexity by providing a simple means for obtaining necessary phase shift information using electronic coherence means. The invention also enables simultaneous measurement of velocity and distance using a single transmitter, which is not generally possible using standard methods.

To track multiple targets or multiple aspects of one or more targets, the invention taught here allows multiple transmitter carrier frequencies (such as different laser wavelengths) to be transmitted and detected simultaneously by employment of separate modulation frequencies on each carrier frequency. In this way, a single receiver can be used to simultaneously measure multiple target parameters, such as target spectral properties or composition.

Figure 11:
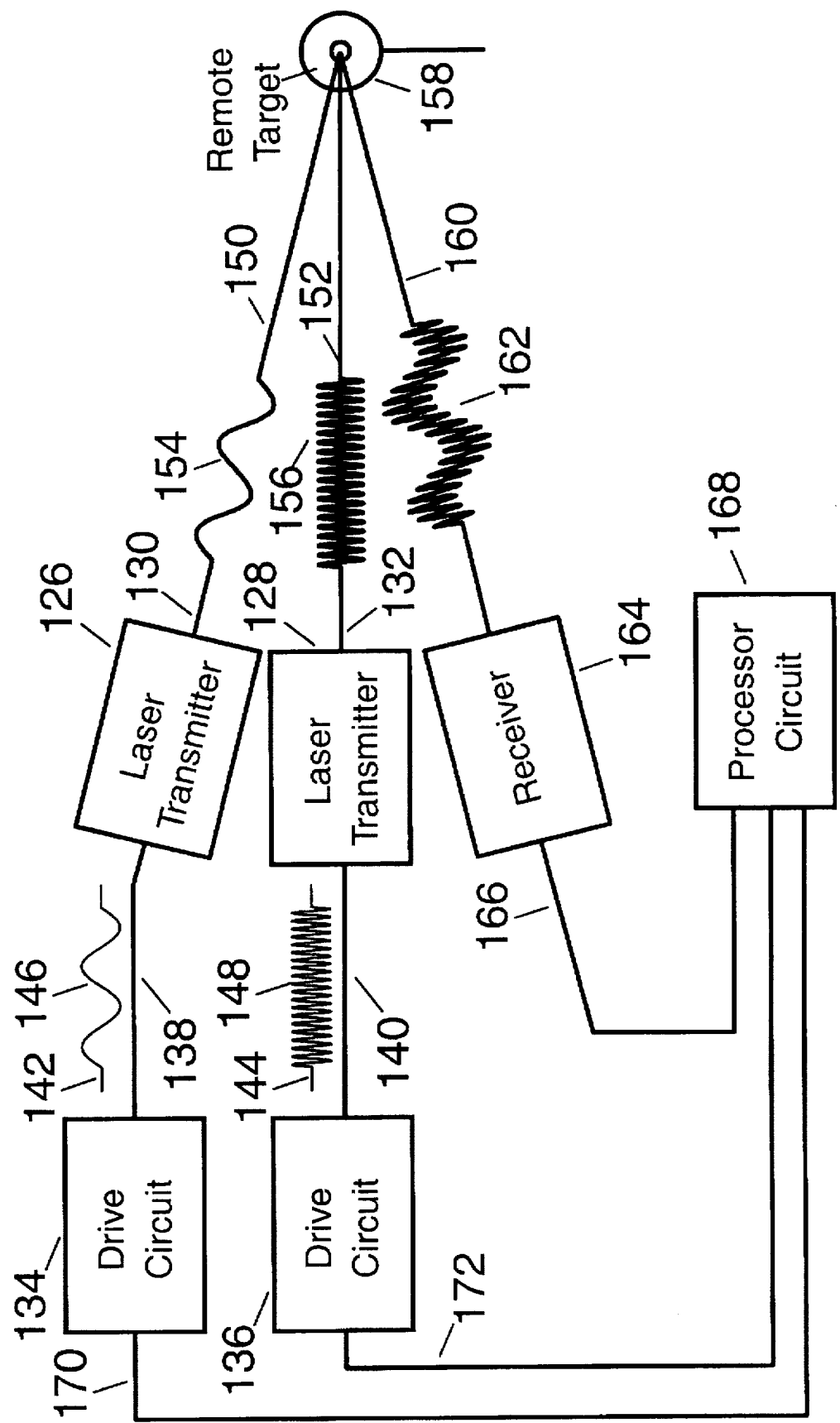
FIG. 11 is a pictorial schematic for describing a general method for simultaneous measurement of coarse and fine distance having a two carrier frequency, two modulation frequency embodiment.

Now referring to FIG. 11 which is a pictorial schematic for describing a two carrier frequency, two modulation frequency embodiment having the following features: first of multiple laser transmitters (126), second of multiple laser transmitters (128), first of multiple transmitter wavelengths (130), second of multiple transmitter wavelengths (132), first of multiple drive circuits (134), second of multiple drive circuits (136), first of multiple separate drive signals (138), second of multiple separate drive signals (140), first of multiple coherent bursts (142), second of multiple coherent bursts (144), first of multiple modulation frequencies (146), second of multiple modulation frequencies (148), first of multiple laser energies (150), second of multiple laser energies (152), first of multiple encoded burst patterns (154), second of multiple encoded burst patterns (156), remote target (158), scattered light (160), summation signal (162), single receiver (164), electronic representation (166), processor circuit (168), first of multiple modulation frequency reference signals (170), and second of multiple modulation frequency reference signals (172).

A first of multiple laser transmitters (126) and a second of multiple laser transmitters (128) emit light at a first of multiple transmitter wavelengths (130) and a second of multiple transmitter wavelengths (132). The first of multiple laser transmitters (126) and second of multiple laser transmitters (128) are individually controlled by a first of multiple drive circuits (134) and a second of multiple drive circuits (136), which deliver a first of multiple separate drive signals (138) and a second of multiple separate drive signals (140) to the first of multiple laser transmitters (126) and the second of multiple laser transmitters (128). These first of multiple separate drive signals (138) and second of multiple separate drive signals (140) consist of a first of multiple coherent bursts (142) and a second of multiple coherent bursts (144) having different first of multiple modulation frequencies (146) and second of multiple modulation frequencies (148), respectively. The first of multiple laser transmitters (126) and the second of multiple laser transmitters (128) emit a first of multiple laser energies (150) and a second of multiple laser energies (152) with a first of multiple encoded burst patterns (154) and a second of multiple encoded burst patterns (156) in direct response to the first of multiple separate drive signals (138) and the second of multiple separate drive signals (140). A remote target (158) is thus simultaneously illuminated by both the first of multiple laser energies (150) and the second of multiple laser energies (152). Scattered light (160) from the remote target (158) thus consists of a summation signal (162) of response arising from independent interaction of the remote target (158) with both the first of multiple laser energies (150) and the second of multiple laser energies (152). This summation signal (162) is collected by a single receiver (164), that provides an electronic representation (166) of the scattered light (160) to a processor circuit (168). The processor circuit (168) uses a first of multiple modulation frequency reference signals (170) and a second of multiple modulation frequency reference signals (172) provided by the first of multiple separate drive circuits (134) and the second of multiple separate drive circuits (136) to electronically demultiplex the summation signal (162) into individual responses arising from simultaneous interaction of the first of multiple transmitter wavelengths (130) and the second of multiple transmitter wavelengths (132) from the first of multiple laser transmitters (126) and the second of multiple laser transmitters (128) with the target (158).

An example of an application for the approach described in FIG. 11 is differential absorption laser ranging. In differential absorption laser ranging, it is necessary to measure optical interaction with a target at several optical wavelengths (or carrier frequencies); an example target is an airborne cloud of a chemical vapor. Prior art has depended on the use of multiple receivers, each configured so as to be exclusively sensitive to an individual return signal resulting from interaction of the target with the output of one of several transmitters, these several transmitters each operating at different wavelengths that are directed onto the target. For example, often two or more lasers are tuned to characteristic optical absorption wavelengths of a chemical cloud, and the return signal from each laser is then measured by one of a similar number of independent detectors. This approach requires separate detector channels for each wavelength, and relies on uniform response from each channel for accurate measurement of the differential response of the target to the multiple transmitter wavelengths. Alternatively, the multiple wavelengths may be transmitted and detected sequentially, using one or multiple transmitters and detectors. Both approaches substantially compromise performance due to likely temporal instabilities of both the measurement instrumentation and the target being measured. They are inherently complex and depend upon stable response of multiple transceiver components over extended periods of time. Also, the responsive bands of the receivers must be tuned synchronously with any changes in transmitter wavelength (or carrier frequency).

The invention as described here avoids these complexities by allowing a single receiver to simultaneously capture a multiplicity of signals, each component of which may result from simultaneous interaction of the output of multiple transmitters with a target. By operating the transmitters at separate modulation frequencies, the multiplexed response of the single receiver may be readily demultiplexed, using standard signal processing methods. Moreover, the carrier frequencies (for example, laser wavelengths) of the multiple transmitters may be substantially varied without need for altering the responsive band of the receiver.

Figure 12:
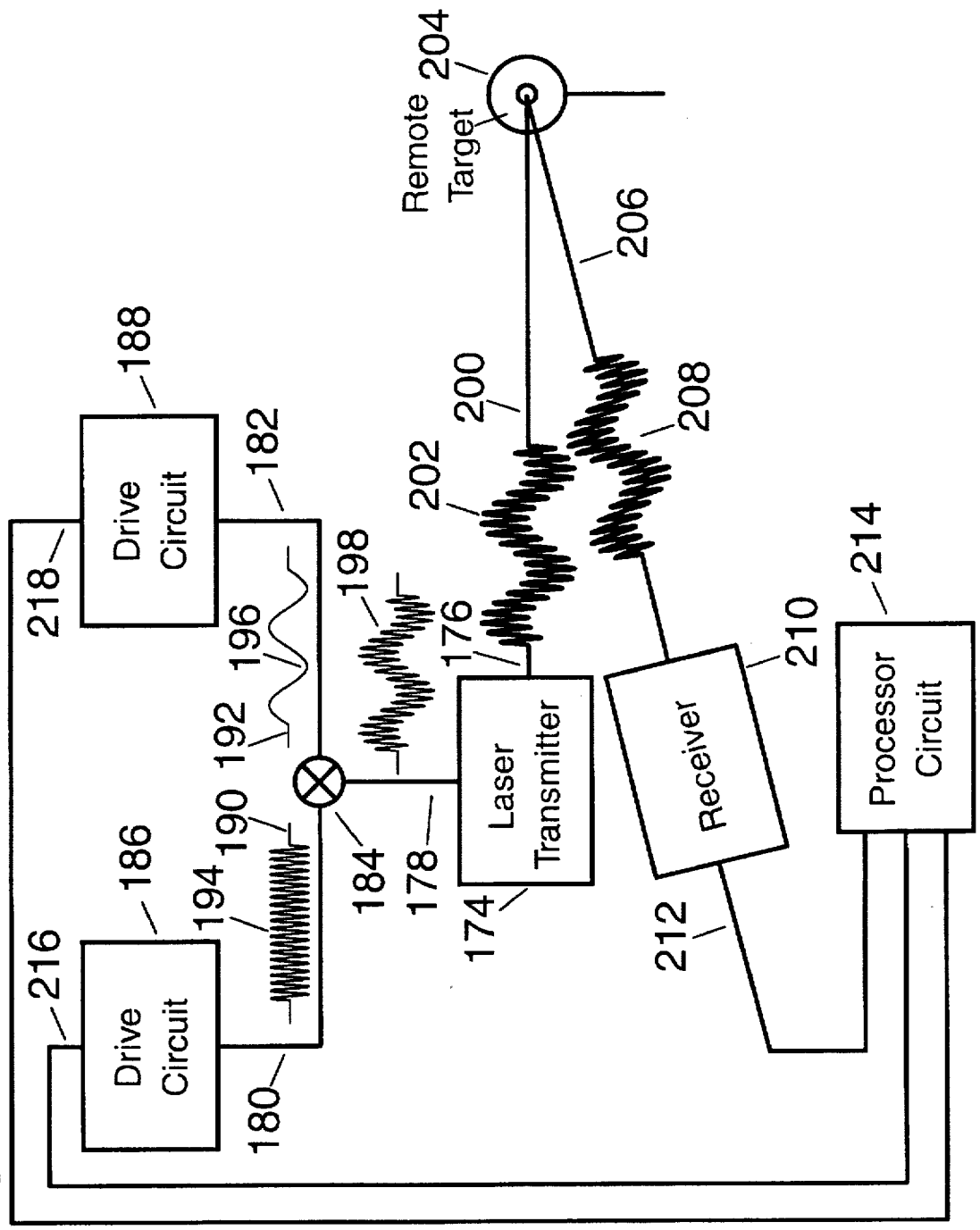
FIG. 12 is a pictorial schematic for describing a general method for simultaneous measurement of coarse and fine distance having a multiple modulation frequency.

Now referring to FIG. 12 which is a pictorial schematic for describing an assembly and operation of the general method for simultaneous measurement of coarse and fine distance with multiple modulation frequencies having the following features: single laser transmitter (174), single wavelength (176), drive signal (178), first of multiple drive signals (180), second of multiple drive signals (182), mixing circuit (184), first of multiple drive circuits (186), second of multiple drive circuits (188), first of multiple coherent bursts (190), second of multiple coherent bursts (192), first of multiple modulation frequencies (194), second of multiple modulation frequencies (196), multiple frequency encoding pattern (198), laser energy (200), encoded burst pattern (202), remote target (204), scattered light (206), encoded burst pattern (208), single receiver (210), electronic representation (212), processor circuit (214), first of multiple modulation frequency reference signals (216), and second of multiple modulation frequency reference signals (218).

Another variation on the multiplexing scheme employs multiple modulation frequencies simultaneously imposed on the emission of a single transmitter source, with each frequency being detected concurrently by a single receiver. A single laser transmitter (174) emits light at a single wavelength (176) under direct control of a drive signal (178). This drive signal (178) consists of the combination of a first of multiple drive signals (180) and a second of multiple drive signals (182) that are combined in a mixing circuit (184), and which are produced by a first of multiple drive circuits (186) and a second of multiple drive circuits (188). The first of multiple drive signals (180) and the second of multiple drive signals (182) consist of a first of multiple coherent bursts (190) and a second of multiple coherent bursts (192) having different first of multiple modulation frequencies (194) and second of multiple modulation frequencies (196). The combined drive signal (178) thereby contains a multiple frequency encoding pattern (198) originating from the first of multiple drive circuits (186) and the second of multiple drive circuits (188). The transmitter (174) emits laser energy (200) with an encoded burst pattern (202) in direct response to the drive signal (178). This laser energy (200) interacts with a remote target (204), wherein the scattered light (206) from the remote target (204) contains an encoded burst pattern (208) that is collected by a single receiver (210). The single receiver (210) provides an electronic representation (212) of the scattered light (206) to a processor circuit (214). The processor circuit (214) uses a first of multiple modulation frequency reference signals (216) and a second of multiple modulation frequency reference signals (218) provided by the first of multiple drive circuits (186) and the second of multiple drive circuits (188) to electronically demultiplex the encoded burst pattern (208) into individual responses arising from simultaneous interaction of the single wavelength (176) at the first of multiple modulation frequencies (194) and the second of multiple modulation frequencies (196) with the remote target (204). The phase delay for each modulation frequency may in this way be independently determined from the multiplexed receiver response using standard signal processing methods, and these phase delays then used to solve an unique set of linear equations for range. Prior art has generally made use of separate discrete modulation frequencies that are applied sequentially to obtain the data necessary for solution of this set of linear equations for range. The invention described here has the advantages of being both faster and requiring the use of less total transmitter power since each of the multiple modulation frequencies are transmitted using a single encoded burst pattern (202).

It will be clear that while the foregoing disclosure has focused on example apparatus and applications using optical radiation, the invention is not limited to optical radiation or to solid targets. In fact, the invention is applicable to use on targets consisting of or contained within virtually all forms of matter, including liquids, gases, vapors, aerosols, mists, dusts, and other particulate forms, along with various solids. If suitable energy sources are used, ranging of targets located within "opaque solids", such as in rocks, buildings, or below the surface of the earth, is made possible and practical through employment of the invention. For example, a single x-ray transceiver could be employed with the coherent burst method to detect buried objects with high precision and accuracy. A second example application is wind shear detection, for which the coherent burst method could be employed using either optical or microwave energies to measure the motion of vapor particles or air molecules. A third example application is detection of breaks or other anomalies in optical fibers, for which the coherent burst method could be employed using optical sources such as diode lasers. A fourth example application is two- or three-dimensional ultrasonic or laser imaging, where the coherent burst method could be used to increase data rates and range precision in scanned or staring imaging devices.

Further, while modulation patterns consisting substantially of a sinusoidal encoding pattern have been the primary focus of the foregoing examples, it will be clear that many other encoding patterns are encompassed within the invention, including square wave amplitude modulation, pseudo random patterns, along with various phase, frequency and polarization modulation approaches. Also, it will be clear that the encoding pattern and modulation frequency can be changed randomly, in order to reduce interference from coherent noise sources or to provide a means for providing security in the transmission and reception of encoded information. Also, it will be clear that the modulation multiplexing and demodulation methods taught herein are applicable for numerous uses beyond those limited to the specific examples of the coherent burst, including applications involving substantially continuous modulation, wherein the advantages taught for multi-frequency burst modulation are directly transferable. Also, it will be clear that other demodulation methods are encompassed within the invention, including correlation based methods.

It will be understood that each of the elements described above, or two or more together, may also find an useful application in other types of constructions differing from the type described above.

While the invention has been illustrated and described as embodied in a general method for simultaneous measurement of coarse and fine distance, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

What is claimed is:

1. A general method for simultaneous measurement of coarse and fine distance (10) consisting of the steps of:
    A) forming at least one transmitter signal (14) by applying at least one coherent burst drive signal (30) to at least one transmitter (32), wherein the at least one coherent burst drive signal (30) comprises high-frequency modulated radiation (16) having at least one modulation frequency which is phase-coherent (18) with at least one reference signal (12);
    B) transmitting the at least one transmitter signal (14) onto at least one target (34);
    C) reflecting a portion of the high-frequency modulated radiation (16) transmitter signal (14) by the at least one target (34);
    D) collecting a portion of the reflected high-frequency modulated radiation (16) emanating from the at least one target (34) by a receiver (36) to form a receiver signal (20);
    E) processing the receiver signal (20) from the receiver (36) using at least one bandwidth limited processor circuit to form at least one real phase component (98) and at least one imaginary phase component (100);
    F) processing the at least one real phase component (98) and the at least one imaginary phase component (100) to determine one or more target parameters selected from a group consisting of range, velocity and composition of the at least one target (34).

2. An apparatus for simultaneous measurement of coarse and fine distance (10) comprising:
    A) at least one transmitter (32) disposed to transmit at least one transmitter signal (14) onto at least one target (34), wherein the at least one transmitter signal (14) is comprised of a coherent burst modulation pattern (48) of high-frequency modulated radiation (16) having at least one modulation frequency which is phase-coherent (18) with at least one reference signal (12);
    B) at least one receiver (36) disposed to receive at least one receiver signal (20), wherein the at least one receiver signal (20) is comprised of an electronic representation (38) of a portion of the reflected transmitter signal (14) comprising high-frequency modulated radiation (16) emanating from the at least one target (34);
    C) at least one processor circuit (42) disposed to process the at least one receiver signal (20) to produce at least one bandwidth limited real phase component (98) and at least one bandwidth limited imaginary phase component (100) that are used to determine at least one delay time (24) and at least one phase shift (26) for the at least one receiver signal (20).

3. The general method for simultaneous measurement of coarse and fine distance (10) as described in claim 1, wherein the step of processing of the at least one real phase component (98) and the at least one imaginary phase component (100) further comprises simultaneous independent measurement of at least one phase shift (26) between the at least one transmitter signal (14) and the receiver signal (20) for the at least one modulation frequency and wherein the at least one simultaneously measured phase shift (26) is used to precisely determine range of the at least one target (34) in a substantially instantaneous fashion.

4. The general method for simultaneous measurement of coarse and fine distance (10) as described in claim 1, wherein the step of processing of the at least one real phase component (98) and the at least one imaginary phase component (100) further comprises the steps of:
    A) determining at least one delay time (24) between transmission of the at least one transmitter signal (14) and reception of the receiver signal (20);
    B) determining at least one phase shift (26) between the at least one transmitter signal (14) and the receiver signal (20) for the at least one modulation frequency.

5. The general method for simultaneous measurement of coarse and fine distance (10) as described in claim 4, wherein the step of processing of the at least one real phase component (98) and the at least one imaginary phase component (100) further comprises the steps of:
    A) determining unambiguous range of the at least one target (34) on a coarse scale using the measured at least one delay time (24) between transmission of the at least one transmitter signal (14) and reception of the receiver signal (20);
    B) determining precise range of the at least one target (34) on a fine scale using the at least one measured phase shift (26) between the at least one transmitter signal (14) and the receiver signal (20) for the at least one modulation frequency;
    C) combining the simultaneously determined coarse scale unambiguous range and the fine scale precise range to determine the precise unambiguous range of the at least one target (34).

6. The general method for simultaneous measurement of coarse and fine distance (10) as described in claim 3, wherein the step of processing of the at least one real phase component (98) and the at least one imaginary phase component (100) further comprises the step of determining a change in the at least one measured phase shift (26) as a function of time which functions to determine velocity of the at least one target (34).

7. The general method for simultaneous measurement of coarse and fine distance (10) as described in claim 4, wherein the step of processing of the at least one real phase component (98) and the at least one imaginary phase component (100) further comprises the step of determining the change in the at least one measured phase shift (26) as a function of time which functions to determine velocity of the at least one target (34).

8. The general method for simultaneous measurement of coarse and fine distance (10) as described in claim 5, wherein the step of processing of the at least one real phase component (98) and the at least one imaginary phase component (100) further comprises the steps of:
   A) determining precise unambiguous range of the at least one target (34) using the combined at least one measured delay time (24) and the at least one measured phase shift (26);
   B) determining velocity of the at least one target (34) by measuring a change in the at least one measured phase shift (26) as a function of time;
   C) combining the determined precise unambiguous range and velocity to simultaneously determine range and velocity of the at least one target (34).

9. The general method for simultaneous measurement of coarse and fine distance (10) as described in claim 1, wherein at least two independent transmitter signals (14) each having at least one independent modulation frequency are directed simultaneously onto at least one target (34), the at least two independent transmitter signals (14) interact independently with the at least one target (34), a portion of the high-frequency modulated radiation (16) from the at least two independent transmitter signals (14) is reflected by the at least one target (34), a portion of the reflected high-frequency modulated radiation (16) is collected by a receiver (36) to form a receiver signal (20), and the receiver signal (20) is processed to demultiplex each portion of the receiver signal (20) emanating from independent interaction of each of the at least two independent transmitter signals (14) with the at least one target (34).

10. The general method for simultaneous measurement of coarse and fine distance (10) as described in claim 1, wherein at least two independent modulation frequencies are used to simultaneously modulate a single transmitter signal (14), the single transmitter signal (14) is directed onto at least one target (34), the single transmitter signal (14) interacts with the at least one target (34), a portion of the high-frequency modulated radiation (16) from the single transmitter signal (14) is reflected by the at least one target (34), a portion of the reflected high-frequency modulated radiation (16) is collected by a receiver (36) to form a receiver signal (20), and the receiver signal (20) is processed to demultiplex each portion of the receiver signal (20) emanating from independent interaction of each of the at least two independent modulation frequencies with the at least one target (34).

11. The general method for simultaneous measurement of coarse and fine distance (10) as described in claim 10, wherein processing of the demultiplexed receiver signal (20) further consists of simultaneously determining phase shifts (26) for each of the at least two independent modulation frequencies and the simultaneously determined phase shifts (26) are used to precisely determine range of the at least one target (34) in a substantially instantaneous fashion.

12. The general method for simultaneous measurement of coarse and fine distance (10) as described in claim 1, wherein the at least one modulation frequency is changed at random or pseudo random intervals to substantially limit detection of the at least one transmitter signal (14) by unauthorized receivers (36).

13. The general method for simultaneous measurement of coarse and fine distance (10) as described in claim 1, wherein the step of processing of the receiver signal (20) from the receiver (36) further comprises determination of a correlation between the at least one reference signal (12) and the receiver signal (20), and wherein the determined correlation is used to precisely determine range of the at least one target (34) in a substantially instantaneous fashion.

14. A general method for simultaneous measurement of coarse and fine distance (10) consisting of the steps of:
   A) converting a continuous reference signal (12) from a master oscillator (66) into a coherent burst drive signal (30) which is issued to a transmitter (32) to generate a transmitter signal (14) consisting of an interrupted burst of high-frequency modulated radiation (16);
   B) transmitting the transmitter signal (14) from the transmitter (32) onto a remote target (34) which reflects a portion of the transmitter signal (14);
   C) detecting a return signal emanating from the remote target (34) by a receiver (36) that functions to produce a receiver signal (20);
   D) processing the receiver signal (20) with a bandwidth limited demodulation unit to form at least one real phase component (98) and at least one imaginary phase component (100);
   E) processing the at least one real phase component (98) and the at least one imaginary phase component (100) to determine range of the remote target (34).

15. The general method for simultaneous measurement of coarse and fine distance (10) as described in claim 14, wherein the transmitter (32) is modulated using a modulation system selected from a group consisting of:
   A) an extra-cavity modulator situated at the output of a transmitter cavity;
   B) an intra-cavity modulator situated inside the transmitter cavity; and
   C) a direct modulation control means applied on the transmitter cavity.

16. The general method for simultaneous measurement of coarse and fine distance (10) as described in claim 14, wherein the master oscillator (66) comprises:
   A) the reference signal (12) for the transmitter (32) and the receiver (36); and
   B) wherein the transmitter (32) and the receiver (36) are configured to operate simultaneously in coherence with the master oscillator (66).

17. The general method for simultaneous measurement of coarse and fine distance (10) as described in claim 14, wherein bandwidth-limited operation is substantially limited to the frequency of the master oscillator (66), and wherein the bandwidth-limited operation is provided by one or more means selected from electronic and mathematical filtering means.

18. The general method for simultaneous measurement of coarse and fine distance (10) as described in claim 14, wherein the bandwidth limited demodulation unit consists of a quadrature heterodyne or superheterodyne mixing circuit; and wherein the at least one real phase component (98) and the at least one imaginary phase component (100) emanating from the mixing circuit are used to produce a signal proportional to the phase shift of the receiver signal relative to the transmitter signal (14); and wherein the signal proportional to phase shift (26) is calibrated to obtain fine range resolution for the receiver signal.

19. The general method for simultaneous measurement of coarse and fine distance (10) as described in claim 18, wherein the measured phase shift (26) signal is combined with a simultaneous measurement of delay time (24) for the at least one real phase component (98) and the at least one imaginary phase component (100) to determine range.

20. The general method for simultaneous measurement of coarse and fine distance (10) as described in claim 14, wherein a transmitter signal (14) is generated by a transmitter selected from a group consisting of a laser transmitter, a microwave transmitter, a millimeter-wave transmitter, a x-ray transmitter, and an acoustic transmitter.

21. The general method for simultaneous measurement of coarse and fine distance (10) as described in claim 14 further comprising:

A) at least one master oscillator (66) source;

B) a single transmitter (32);

C) a modulation system configured so as to impose a modulation pattern derived from the combined output of the at least one master oscillator (66) on the output of the single transmitter (32);

D) a receiver for detection of a receiver signal (20) resulting from an interaction of the output of the transmitter (32) with the target (34);

E) a demodulation system from which at least one phase shift (26) is measured in the receiver signal (20) at the at least one modulation frequency; and F) a processor circuit (42) which functions to determine distance based on the at least one phase shift (26) for the at least one modulation frequency.

22. The general method for simultaneous measurement of coarse and fine distance (10) as described in claim 14 further comprising:

A) at least two master oscillators (66) and at least two transmitters (32) electronically coupled;

B) a modulation system coupled to the at least two transmitters (32), the modulation system functioning to cause the at least two transmitters (32) to output independent transmitter signals (14);

C) a receiver (36) for detection of a receiver signal (20) reflected from a target (34);

D) a demodulation system from which at least two independent signals are measured in the receiver signal (20) corresponding to each of the at least two transmitters (32); and E) a processor circuit (42) electronically connected to the receiver (36), the processor circuit (42) functioning to determine independent parameters of the target (34) related to independent interaction of the at least two transmitter signals (14) with the target (34).

23. The general method for simultaneous measurement of coarse and fine distance (10) as described in claim 14 further comprising:

A) a master oscillator (66);

B) a transmitter (32);

C) a modulation system functioning to output a modulation pattern derived from the output of the master oscillator (66) on the output of the transmitter (32);

D) a receiver (36) for detection of a receiver signal (20) emanating from interaction of the output of the transmitter (32) with a target (34);

E) a demodulation system from which phase shift (26) is measured in the receiver signal (20); and F) a processor circuit (42) configured to determine velocity of the target (34) based on the change in phase shift (26) of the modulation frequency as a function of time.

* * * * *